(12) United States Patent
Zeng et al.

(10) Patent No.: US 11,347,685 B2
(45) Date of Patent: May 31, 2022

(54) FILE MANAGEMENT METHOD AND APPARATUS

(71) Applicant: HUAWEI TECHNOLOGIES CO., LTD., Guangdong (CN)

(72) Inventors: Zhi Zeng, Shenzhen (CN); Chongning Jiang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 105 days.

(21) Appl. No.: 16/650,097

(22) PCT Filed: Sep. 26, 2017

(86) PCT No.: PCT/CN2017/103533
§ 371 (c)(1),
(2) Date: Mar. 24, 2020

(87) PCT Pub. No.: WO2019/061040
PCT Pub. Date: Apr. 4, 2019

(65) Prior Publication Data
US 2020/0218694 A1     Jul. 9, 2020

(51) Int. Cl.
*G06F 16/13*     (2019.01)
*G06F 16/16*     (2019.01)

(52) U.S. Cl.
CPC .......... *G06F 16/13* (2019.01); *G06F 16/168* (2019.01)

(58) Field of Classification Search
CPC .... G06F 16/168; G06F 16/972; G06F 3/0482; G06F 3/04842; G06F 16/2455; G06F 16/00
See application file for complete search history.

(56) References Cited

U.S. PATENT DOCUMENTS

2009/0183117 A1* 7/2009 Chang .............. G06F 16/168
                                                    715/810
2010/0080469 A1* 4/2010 Liu .................. G06K 9/4671
                                                    382/201
(Continued)

FOREIGN PATENT DOCUMENTS

CN       103124309 A     5/2013
CN       104182529 A     12/2014
(Continued)

*Primary Examiner* — Angelica Ruiz
(74) *Attorney, Agent, or Firm* — Womble Bond Dickinson (US) LLP

(57) ABSTRACT

A file management method and an apparatus, related to the field of communications technologies, can trigger, on an interface of an application, searching and management of a file displayed on the interface, to improve file management efficiency in a terminal. The method includes: displaying an interface of the first application; storing a target file received through the first application; extracting related information of the target file, where the related information of the target file includes file feature information, and the file feature information includes a name of the target file; searching for a storage path of the target file in storage space of the terminal based on the related information of the target file; and displaying a control used for performing file management on the target file if the storage path of the target file is successfully found.

18 Claims, 22 Drawing Sheets

(56) References Cited

U.S. PATENT DOCUMENTS

| | | | |
|---|---|---|---|
| 2010/0325199 A1* | 12/2010 | Park | ............ G06F 16/10 |
| | | | 709/203 |
| 2017/0206019 A1* | 7/2017 | Zhang | ............ G06F 11/1464 |
| 2018/0234364 A1 | 8/2018 | Gong et al. | |

FOREIGN PATENT DOCUMENTS

| | | |
|---|---|---|
| CN | 104199897 A | 12/2014 |
| CN | 104424162 A | 3/2015 |
| CN | 105227444 A | 1/2016 |
| CN | 105488131 A | 4/2016 |
| CN | 105577818 A | 5/2016 |
| CN | 106294591 A | 1/2017 |
| CN | 106354804 A | 1/2017 |
| CN | 106406755 A | 2/2017 |
| WO | 2014010891 A1 | 1/2014 |

* cited by examiner

FILE MANAGEMENT METHOD AND APPARATUS

CROSS-REFERENCE TO RELATED APPLICATIONS

This application is a national stage of International Application No. PCT/CN2017/103533, filed on Sep. 26, 2007, which is hereby incorporated by reference in its entirety.

TECHNICAL FIELD

Embodiments of this application relate to the field of communications technologies, and in particular, to a file management method and an apparatus.

BACKGROUND

At present, many applications in a terminal may support a file receive or file download function in a running process. For example, when a user uses an instant messaging application in the terminal, the user may send a file such as a document, a video, audio, and a picture to contacts in a chat interface, and when the user browses a webpage, the user may also download a file such as a document, a picture and the like in the page.

Usually, these files transmitted to the terminal may be stored into a corresponding folder by the terminal (for example, a mobile phone). For example, a mobile phone may create a folder named picture in a downloads folder of a secure digital card (SD card), and when a user performs an operation of downloading a picture in a browsed page by using a browser, the mobile phone may store the downloaded picture into the foregoing folder named picture, that is, a storage path of the downloaded picture is: Sdcard/downloads/picture/.

The user may open file management software such as a file manager to find these files, and then perform corresponding management operations such as deleting, moving, compressing, or editing. However, usually, the user does not know a specific storage path of these files. In this case, the user may perform full-disk searching by entering keywords and the like, but this searching manner is time-consuming and tedious, and efficiency of file management in the terminal is greatly reduced.

SUMMARY

Embodiments of this application provide a file management method and an apparatus, which can trigger, on an interface of an application, searching and management of a file displayed on the interface, to improve file management efficiency in a terminal.

To achieve the foregoing objective, the following technical solutions are used in the embodiments of this application.

According to a first aspect, an embodiment of this application provides a file management method, which may be applied to a terminal installed with a first application, and the method includes: displaying, by the terminal, an interface of the first application; storing, by the terminal, a target file received through the first application; extracting, by the terminal, related information of the target file, where the related information of the target file includes file feature information, and the file feature information includes a name of the target file; searching, by the terminal, for a storage path of the target file in storage space of the terminal based on the related information of the target file; and displaying, by the terminal, a control used for performing file management on the target file if the storage path of the target file is successfully found.

That is, when an application runs in the terminal, if the terminal obtains a downloaded or transferred target file through the application, the terminal may quickly locate a specific storage path of the target file, to provide, on a current display interface of the application, a quick entry at which management is performed on the target file to the user. The user does not need to manually search a full disk for the target file, to improve file management efficiency in the terminal.

In a possible embodiment, the related information of the target file further includes application feature information of the first application, and the application feature information includes a name of the first application, and/or a name of a display interface of the terminal when the target file is being downloaded; and the searching, by the terminal, for a storage path of the target file in storage space of the terminal based on the related information of the target file includes: determining, by the terminal, a search path of the target file based on the application feature information of the first application; and searching, by the terminal, the search path for the target file based on the file feature information of the target file. In this way, the terminal may reduce a searching range of the target file based on the application feature information of the first application, and as compared with a searching manner of searching in a full disk of the mobile phone, a file searching rate is greatly improved.

In a possible embodiment, the determining, by the terminal, a search path of the target file based on the application feature information of the first application includes: searching, by the terminal, a stored correspondence between application feature information and search paths for a search path corresponding to the application feature information of the first application. Then, based on the correspondence between application feature information and search paths, a search path of the target file may be quickly determined.

In a possible embodiment, if the search path corresponding to the application feature information of the first application is not included in the correspondence between application feature information and search paths, the method further includes: searching, by the terminal based on a preset priority order, for the storage path of the target file in the storage space of the terminal in sequence.

In a possible embodiment, after the terminal searches for the storage path of the target file in the terminal based on the file feature information, the method further includes: if the storage path of the target file is successfully found, updating, by the terminal in the correspondence between application feature information and search paths, the found storage path of the target file as the search path corresponding to the application feature information of the first application.

That is, the terminal may further learn, based on a searching result of searching for the target file each time, a specific storage path in which the terminal receives a file through each application, to optimize the correspondence between application feature information and search paths based on a learning result, so that when the terminal subsequently extracts application feature information of a new target file, a search path of the new target file can be quickly and accurately determined through the correspondence.

In a possible embodiment, before the extracting, by the terminal, related information of the target file, the method further includes: receiving, by the terminal, a target gesture performed by a user for the target file; and the extracting, by the terminal, related information of the target file specifically includes: extracting, by the terminal, the related information of the target file in response to the target gesture. In this way, after the terminal receives the target file through a target application, the user can trigger, by performing a gesture on the target file, the terminal to quickly locate the received target file, and the user can manage the target file without switching to another interface or application.

It should be understood that in an actual product according to embodiments discussed herein, after the terminal receives the target file through the target application, the user may also perform a gesture on the interface of the first application to trigger the terminal to quickly locate the received target file.

In a possible embodiment, the target file is a picture, and the file feature information further includes a picture eigenvalue for reflecting display content in the picture; or the target file is audio, and the file feature information further includes label information carried in the audio.

In a possible embodiment, the displaying, by the terminal, a control used for performing file management on the target file includes: displaying, by the terminal, a floating target prompt window in a current display interface of the first application, where the target prompt window includes a shortcut key used for managing the target file. That is, a file management entry set for the received target file is provided for the user on the display interface of the first application, so that the user can manage the target file without switching to a file manager to search for the target file after receiving the target file by using the first application, thereby greatly improving file management efficiency in the terminal.

In a possible embodiment, the shortcut key includes a sharing shortcut key; and after the displaying, by the terminal, a control used for performing file management on the target file, the method further includes: when it is detected that the user triggers the sharing shortcut key, displaying, by the terminal, a shortcut key of a second application for allowing sharing the target file, where the second application is different from the first application; and when it is detected that the user triggers the shortcut key of the second application, sharing, by the terminal, the target file to a device of another user through the second application, or loading, by the terminal, the target file as an attachment to a display interface of the second application. Therefore, the user is provided with a shortcut entry for sharing the target file across applications.

In a possible embodiment, the shortcut key includes an opening shortcut key; and after the displaying, by the terminal, a control used for performing file management on the target file, the method further includes: when it is detected that the user triggers the opening shortcut key, displaying, by the terminal, a shortcut key of a third application for allowing opening the target file, where the third application is different from the first application; and when it is detected that the user triggers the shortcut key of the third application, opening, by the terminal, the target file by using the third application. Therefore, the user is provided with a shortcut entry for opening the target file across applications.

In a possible embodiment, the shortcut key includes a jumping shortcut key; and after the displaying, by the terminal, a control used for performing file management on the target file, the method further includes: when it is detected that the user triggers the jumping shortcut key, displaying, by the terminal, an interface of a local path that stores or manages the target file. Therefore, the user is provided with a shortcut entry jumping to an interface of the path that stores the target file.

In a possible embodiment, if the storage path of the target file is successfully found, the method further includes: displaying, by the terminal, the storage path of the target file in the current display interface of the first application.

According to a second aspect, an embodiment of this application provides a terminal, installed with a first application, where the terminal includes a processor, and a memory, a display, and an input device that are connected to the processor, where the display is configured to display an interface of the first application; the memory is configured to store a target file received through the first application; the processor is configured to: extract related information of the target file, where the related information of the target file includes file feature information, and the file feature information includes a name of the target file; and search for a storage path of the target file in storage space of the terminal based on the related information of the target file; and the display is further configured to display a control used for performing file management on the target file if the storage path of the target file is successfully found.

In a possible embodiment, the related information of the target file further includes application feature information of the first application, and the application feature information includes a name of the first application, and/or a name of a display interface of the terminal when the target file is being downloaded; and the processor is specifically configured to: determine a search path of the target file based on the application feature information of the first application; and search the search path for the target file based on the file feature information of the target file.

In a possible embodiment, the processor is specifically configured to search a stored correspondence between application feature information and search paths for a search path corresponding to the application feature information of the first application.

In a possible embodiment, the processor is specifically configured to search for the storage path of the target file in the storage space of the terminal in sequence based on a preset priority order if the search path corresponding to the application feature information of the first application is not included in the correspondence between application feature information and search paths.

In a possible embodiment, the processor is further configured to: if the processor successfully finds the storage path of the target file, update, in the correspondence between application feature information and search paths, the found storage path of the target file as the search path corresponding to the application feature information of the first application.

In a possible embodiment, the terminal further includes an input device, where the input device is configured to receive a target gesture performed by a user for the target file; and the processor is specifically configured to extract the related information of the target file in response to the target gesture.

In a possible embodiment, the display is specifically configured to display a floating target prompt window in a current display interface of the first application, where the target prompt window includes a shortcut key used for managing the target file.

In a possible embodiment, the shortcut key includes a sharing shortcut key; and the display is further configured to: when the processor detects that the user triggers the sharing shortcut key, display a shortcut key of a second application for allowing sharing the target file, where the second application is different from the first application; and the processor is further configured to: when the processor detects that the user triggers the shortcut key of the second application, share the target file to a device of another user through the second application, or load the target file as an attachment to a display interface of the second application.

In a possible embodiment, the shortcut key includes an opening shortcut key; and the display is further configured to: when the processor detects that the user triggers the opening shortcut key, display a shortcut key of a third application for allowing opening the target file, where the third application is different from the first application; and the processor is further configured to: when the processor detects that the user triggers the shortcut key of the third application, open the target file by using the third application.

In a possible embodiment, the shortcut key includes a jumping shortcut key; and the display is further configured to: when the processor detects that the user triggers the jumping shortcut key, display an interface of a local path that stores or manages the target file.

In a possible embodiment, the display is further configured to display the storage path of the target file in the current display interface of the first application if the processor successfully finds the storage path of the target file.

According to a third aspect, an embodiment of this application provides a terminal, including: a processor, a memory, a bus, and a communications interface, where the memory is configured to store a computer executable instruction, the processor communicates with the memory through the bus, and when the terminal runs, the processor executes the computer executable instruction stored in the memory, to enable the terminal to perform any one of the foregoing application switching methods.

According to a fourth aspect, an embodiment of this application provides a computer-readable storage medium, storing an instruction, where when the instruction is run on a terminal, the terminal is enabled to perform any one of the foregoing file management methods.

According to a fifth aspect, an embodiment of this application provides a computer program product including an instruction, where when the computer program product is run on a computer, the terminal is enabled to perform any one of the foregoing file management methods.

According to a sixth aspect, an embodiment of this application provides a graphical user interface (GUI), where the graphical user interface is stored in a terminal, the terminal includes a touchscreen, a memory, and one or more processors, and the one or more processors are configured to execute one or more computer programs stored in the memory, where the graphical user interface includes: a first GUI displaying a first application in the touchscreen, where the first GUI displays a control of a target file obtained by the terminal through the first application in a dialog interface, and the first application is an instant messaging application; a second GUI displayed in the first GUI in response to a first gesture of triggering the control of the target file by a user, where a sharing shortcut key for sharing the target file is displayed in the second GUI; a candidate application list that allows sharing the target file and that is displayed in the first GUI in response to a second gesture of selecting the sharing shortcut key by the user; and a third GUI displayed in the touchscreen in response to a third gesture of selecting a second application by the user from the candidate application list, where the third GUI is an interface in which the target file is shared through the second application, and the second application is different from the first application.

In a possible embodiment, the third GUI includes a display interface in which the target file is loaded as an attachment to the second application, or the third GUI includes a display interface in which the second application searches for another terminal to transfer the target file.

According to a seventh aspect, an embodiment of this application provides a GUI, where the GUI may be stored in a terminal, the terminal includes a touchscreen, a memory, and one or more processors, and the one or more processors are configured to execute one or more computer programs stored in the memory, where the foregoing GUI specifically includes: a first GUI displaying a first application (the first application is an instant messaging application) in the touchscreen, where the first GUI displays a control of a target file obtained by the terminal through the first application in a dialog interface; a second GUI displayed in the first GUI in response to a first gesture of triggering the control of the target file by a user, where an opening shortcut key opening the target file is displayed in the second GUI; a candidate application list that allows opening the target file and that is displayed in the first GUI in response to a second gesture of selecting the opening shortcut key by the user; and a third GUI displayed in the touchscreen in response to a third gesture of selecting a third application (the third application is different from the first application) by the user from the candidate application list, where the third GUI is an interface in which the target file is opened through the third application.

According to an eighth aspect, an embodiment of this application provides a GUI, where the GUI may be stored in a terminal, the terminal includes a touchscreen, a memory, and one or more processors, and the one or more processors are configured to execute one or more computer programs stored in the memory, where the foregoing GUI specifically includes: a first GUI displaying a first application (the first application is an instant messaging application) in the touchscreen, where the first GUI displays a control of a target file obtained by the terminal through the first application in a dialog interface; a second GUI displayed in the first GUI in response to a first gesture of triggering the control of the target file by a user, where a jumping shortcut key is displayed in the second GUI; and a third GUI on which the terminal jumps from the second GUI to a path that stores the target file and that is in the terminal in response to a second gesture of selecting the jumping shortcut key by the user, or a third GUI on which the terminal jumps from the second GUI to a path that manages the target file and that is in the terminal in response to a second gesture of selecting the jumping shortcut key by the user.

In the embodiments of this application, a name of each unit module in the foregoing terminal does not constitute a limitation on the device, and in an actual implementation, these unit modules may have other names. The unit modules fall within the scope of the claims of this application and their equivalent technologies provided that functions of the unit modules are similar to those in the embodiments of this application.

In addition, for technical effects brought by any one of the design manners in the second aspect to the eighth aspect, refer to technical effects brought by different design methods in the foregoing first aspect. Details are not described herein again.

DESCRIPTION OF EMBODIMENTS

The following terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the description of the embodiment of this application, unless otherwise stated, "a plurality of" means two or more than two.

A file management method provided in the embodiments of this application may be applied to any terminal such as a mobile phone, a wearable device, an augmented reality (AR)/virtual reality (VR) device, a tablet computer, a notebook computer, an ultra-mobile personal computer (UMPC), a netbook, a personal digital assistant (PDA), and the like. Certainly, in the following embodiments, a specific form of the terminal is not limited in any way.

Figure 1:
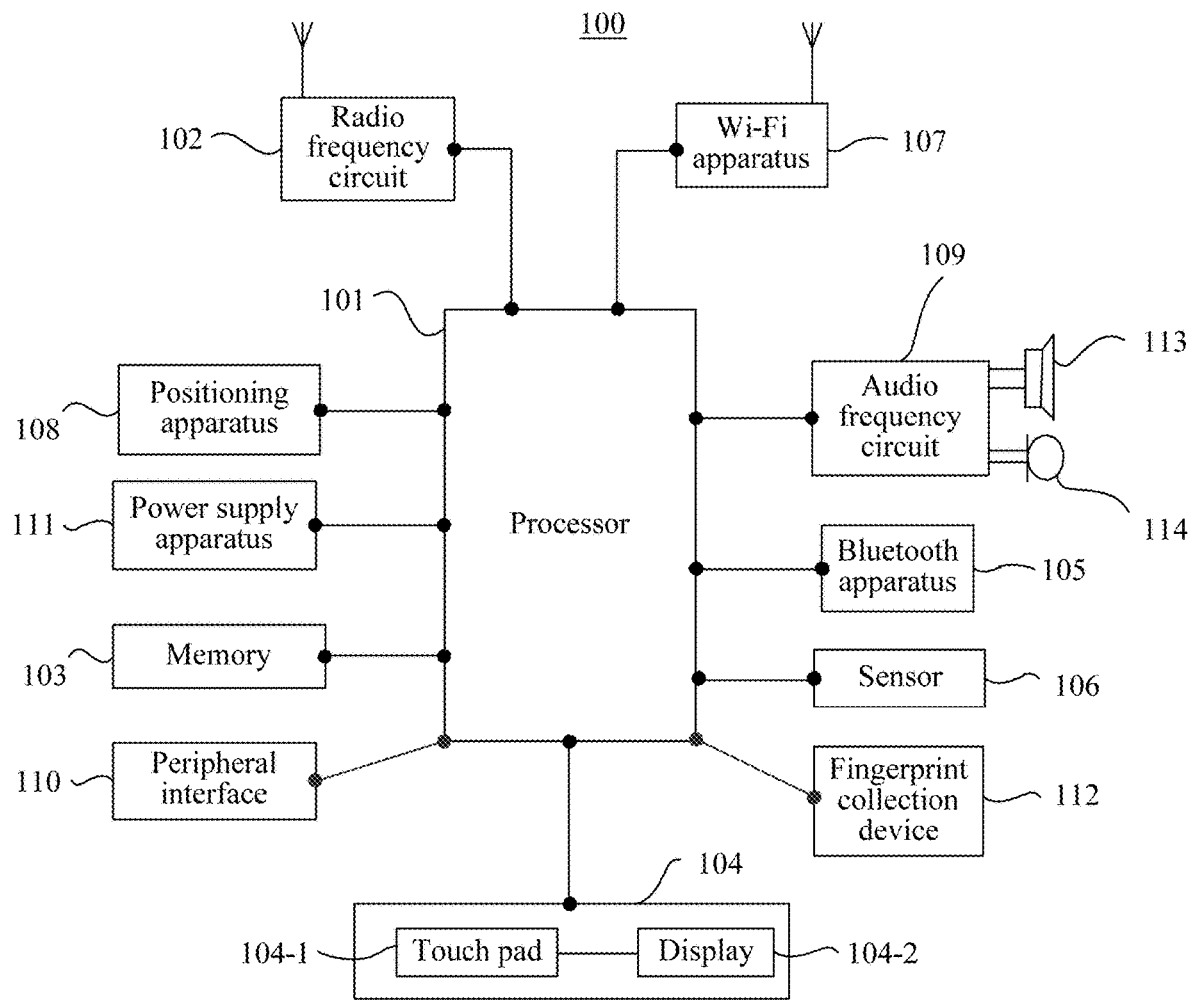
FIG. 1 is a schematic structural diagram of a terminal according to an embodiment of this application.

As shown in FIG. 1, a terminal in an embodiment of this application may be a mobile phone 100. The following describes this embodiment in detail by using the mobile phone 100 as an example. It should be understood that the mobile phone 100 shown in the figure is merely an example of the foregoing terminal, and the mobile phone 100 may include more components or fewer components than those shown in the figure, or two or more components may be combined, or a different component deployment may be used.

As shown in FIG. 1, the mobile phone 100 may specifically include: a processor 101, a radio frequency (RF) circuit 102, a memory 103, a touchscreen 104, a Bluetooth apparatus 105, one or more sensors 106, a wireless fidelity (Wi-Fi) apparatus 107, a positioning apparatus 108, an audio frequency circuit 109, a peripheral interface 110, a power supply system 111, and other components. These components may communicate with each other by using one or more communications buses or signal cables (not shown in FIG. 1). A person skilled in the art may understand that a hardware structure shown in FIG. 1 does not constitute a limitation to the mobile phone. The mobile phone 100 may include more components or fewer components than those shown in the figure, or some components may be combined, or a different component deployment may be used.

With reference to FIG. 1, the following specifically describes components of the mobile phone 100.

The processor 101 is a control center of the mobile phone 100, and is connected to parts of the mobile phone 100 by using various interfaces and lines. By running or executing an application stored in the memory 103, and invoking data stored in the memory 103, the processor 101 performs various functions of the mobile phone 100 and processes data. In some embodiments, the processor 101 may include one or more processing units. For example, the processor 101 may be a Kirin 960 chip manufactured by Huawei Technologies Co., Ltd. In some embodiments of this application, the foregoing processor 101 may further include a fingerprint verification chip, configured to verify a collected fingerprint.

The radio frequency circuit 102 may be configured to receive and send a radio signal during information receiving and sending or a call. In particular, the radio frequency circuit 102 may receive downlink data of a base station and then delivers the downlink data to the processor 101 for processing. In addition, the radio frequency circuit 102 sends uplink-related data to the base station. Usually, the radio frequency circuit includes, but is not limited to, an antenna, at least one amplifier, a transceiver, a coupler, a low noise amplifier, a duplexer, and the like. In addition, the radio frequency circuit 102 may further communicate with another device through wireless communication. The wireless communication may use any communications standard or protocol, including, but not limited to, a global system for mobile communications, a general packet radio service, code division multiple access, wideband code division multiple access, long term evolution, email, a short message service message service, and the like.

The memory 103 is configured to store an application and data. The processor 101 runs the application and the data that are stored in the memory 103, to perform various functions of the mobile phone 100 and data processing. The memory 103 mainly includes a program storage area and a data storage area. The program storage area may store an operating system, an application required by at least one function (such as a sound playing function or an image playing function). The data storage area may store data (such as audio data and a phone book) created based on use of the mobile phone 100. In addition, the memory 103 may include a high-speed random access memory (RAM), and may further include a non-volatile memory such as a magnetic disk storage device, a flash memory device, another volatile solid-state storage device, or the like. The memory 103 may store various operating systems, for example, an iOS® operating system developed by Apple Inc. and an Android® operating system developed by Google Inc. The foregoing memory 103 may be independent, and is connected to the processor 101 by using the foregoing communications bus; or the memory 103 may be integrated with the processor 101.

The touchscreen 104 may specifically include a touch pad 104-1 and a display 104-2.

The touch pad 104-1 may collect a touch event of a user of the mobile phone 100 on or near the mobile phone 100 (for example, an operation of the user on the touch pad 104-1 or near the touch pad 104-1 by using any suitable object such as a finger or a stylus), and send collected touch information to another device (for example, the processor 101). The touch event of the user near the touch pad 104-1 may be referred to as a floating touch. The floating touch may indicate that without directly touching the touch pad to select, move, or drag a target (for example, a control), the user can execute a desired function provided that the user is close to the terminal. In addition, the touch pad 104-1 may be implemented into touch pads of a plurality of types such as resistive, capacitive, infrared, and surface acoustic wave.

The display (also referred to as a display screen) 104-2 may be configured to display information that is entered by the user or information provided to the user, and various menus of the mobile phone 100. The display 104-2 may be configured in forms such as a liquid crystal display, an organic light-emitting diode, and the like. The touch pad 104-1 may cover the display 104-2. After detecting a touch event on or near the touch pad 104-1, the touch pad 104-1 transfers the touch event to the processor 101, to determine a type of the touch event. Then, the processor 101 may provide a corresponding visual output on the display 104-2 based on the type of the touch event. In FIG. 1, the touch pad 104-1 and the display screen 104-2 are used as two independent components to implement input and output functions of the mobile phone 100. However, in some embodiments, the touch pad 104-1 and the display screen 104-2 may be integrated to implement the input and output functions of the mobile phone 100. It may be understood that the touchscreen 104 is formed by stacking a plurality of layers of materials. In this embodiment of this application, only the touch pad (layer) and the display screen (layer) are presented, and another layer is not described in this embodiment of this application. In addition, the touch pad 104-1 may be disposed on the front side of the mobile phone 100 in a full panel form, and the display screen 104-2 may also be disposed on the front side of the mobile phone 100 in a full panel form. In this way, a bezel-less structure can be implemented on the front side of the mobile phone.

In addition, the mobile phone 100 may further include a fingerprint recognition function. For example, a fingerprint recognizer 112 may be disposed on the back side of the mobile phone 100 (for example, below a rear-facing camera), or a fingerprint recognizer 112 may be disposed on the front side of the mobile phone 100 (for example, below the touchscreen 104). For another example, the fingerprint collection device 112 may be disposed on the touchscreen 104 to implement the fingerprint recognition function, that is, the fingerprint collection device 112 may be integrated with the touchscreen 104 to implement the fingerprint recognition function of the mobile phone 100. In this case, the fingerprint collection device 112 is disposed on the touchscreen 104, and may be a part of the touchscreen 104, or may be disposed on the touchscreen 104 in another form. A main component of the fingerprint collection device 112 in this embodiment of this application is a fingerprint sensor. The fingerprint sensor may use any type of sensing technologies, including but not limited to, an optical type, a capacitive type, a piezoelectric type, or an ultrasonic wave type of the sensing technologies.

The mobile phone 100 may further include the Bluetooth apparatus 105, configured to implement data exchange between the mobile phone 100 and another short-range terminal (for example, a mobile phone or a smartwatch). The Bluetooth apparatus in this embodiment of this application may be an integrated circuit or a Bluetooth chip.

The mobile phone 100 may further include at least one sensor 106 such as an optical sensor, a motion sensor, and another sensor. Specifically, the optical sensor may include an ambient light sensor and a proximity sensor. The ambient light sensor can adjust brightness of a display of the touchscreen 104 based on brightness of ambient light, and the proximity sensor can turn off a power supply of the display when the mobile phone 100 is moved to an ear. As one type of motion sensor, an acceleration sensor may detect magnitude of accelerations in various directions (generally on three axes), may detect magnitude and a direction of the gravity when static, and may be configured to identify an application of the mobile phone gesture (such as switchover between landscape orientation and portrait orientation, a related game, and gesture calibration of a magnetometer), a function related to vibration recognition (such as a pedometer and a knock), and the like. Other sensors such as a gyroscope, a barometer, a hygrometer, a thermometer, and an infrared sensor may also be configured in the mobile phone 100, and details are not described herein again.

The Wi-Fi apparatus 107 is configured to provide network access complying with a standard protocol related to Wi-Fi to the mobile phone 100. The mobile phone 100 may access a Wi-Fi access point by using the Wi-Fi apparatus 107, and further help the user receive and send an email, browse a webpage, access streaming media, and so on. The mobile phone 100 provides wireless wideband Internet access to the user. In some other embodiments, the Wi-Fi apparatus 107 may alternatively serve as the Wi-Fi wireless access point, and may provide Wi-Fi network access to another terminal.

The positioning apparatus 108 is configured to provide a geographical location to the mobile phone 100. It can be understood that, the positioning apparatus 108 may be specifically a receiver of a positioning system such as the global positioning system (GPS), the BeiDou navigation satellite system, or the Russian global navigation satellite system (GLONASS). After receiving a geographical location sent by the positioning system, the positioning apparatus 108 sends the information to the processor 101 for processing, or sends the information to the memory 103 for storage. In some other embodiments, the positioning apparatus 108 may further be a receiver of an assisted global positioning system (AGPS). The AGPS system serves as an assisted server to help the positioning apparatus 108 complete a ranging service and a positioning service. In this case, the assisted positioning server provides positioning assistance by communicating with the positioning apparatus 108 (namely, a GPS receiver) of the terminal such as the mobile phone 100 by using a wireless communications network. In some other embodiments, the positioning apparatus 108 may alternatively be a positioning technology based on a Wi-Fi access point. Each Wi-Fi access point has a globally unique media access control (MAC) address, and the terminal can scan and collect a broadcast signal of a nearby Wi-Fi access point when Wi-Fi is enabled. Therefore, a MAC address broadcast by the Wi-Fi access point may be obtained. The terminal sends the data (for example, the MAC address) that can mark the Wi-Fi access point to a location server by using the wireless communications network, and the location server retrieves a geographical location of each Wi-Fi access point, calculates a geographical location of the terminal based on strength of a Wi-Fi broadcast signal, and sends the geographical location to the positioning apparatus 108 of the terminal.

The audio frequency circuit 109, a speaker 113, and a microphone 114 may provide audio interfaces between the user and the mobile phone 100. The audio frequency circuit 109 may convert received audio data into an electrical signal and transmit the electrical signal to the speaker 113. The speaker 113 converts the electrical signal into a sound signal for output. In addition, the microphone 114 converts a collected sound signal into an electrical signal. The audio frequency circuit 109 receives the electrical signal, converts the electrical signal into audio data, and outputs the audio data to the RF circuit 102 to send the audio data to, for example, another mobile phone, or outputs the audio data to the memory 103 for further processing.

The peripheral interface 110 is configured to provide various interfaces to external input/output devices (such as a keyboard, a mouse, an external display, an external memory, and a subscriber identity module card). For example, a mouse is connected by using a universal serial bus (USB) interface, and a subscriber identity module (SIM) card provided by a telecommunications operator is connected by using a metal contact on a subscriber identity module card slot. The peripheral interface 110 may be configured to couple the foregoing external input/output peripheral devices to the processor 101 and the memory 103.

The mobile phone 100 may further include the power supply apparatus 111 (such as a battery or a power management chip) for supplying power to the components. The battery may be logically connected to the processor 101 by using the power management chip, thereby implementing functions such as charging and discharging management and power consumption management by using the power supply apparatus 111.

Although not shown in FIG. 1, the mobile phone 100 may further include cameras (a front-facing camera and/or a rear-facing camera), a flash, a micro-projection apparatus, a near field communication (NFC) apparatus, and the like. Details are not described herein.

To clearly describe a file management method according to this embodiment of this application, the following first introduces concepts that may appear in some subsequent embodiments.

File management refers to organizing, allocating, and recycling storage space of the terminal, retrieving, sharing, and protecting stored files, and the like. Specific file management may include: opening, deleting, moving, sharing, editing, compressing, and the like. This is not limited in this embodiment of this application. The storage space of the terminal includes storage space of an internal memory and storage space of an external storage medium (such as an SD card).

A target file refers to a file obtained, when the terminal runs an application having a file transfer or file download function, by receiving (for example, directly receiving from another terminal) or downloading (for example, downloading from a server) through the application, for example, a picture, a document, a video, and audio. The application may be referred to as a target application.

Related information of the target file may include file feature information of the foregoing target file. For example, when the target file is a document-type file (for example, a Word document, a PDF document, or an Excel document), the foregoing file feature information may specifically include information such as a name and an extension of the target file. When the target file is a picture-type file (for example, a photograph or a GIF motion graph), in addition to the information such as the name and the extension of the target file, the foregoing file feature information may further include a picture eigenvalue of the picture, for example, an scale-invariant feature transform (SIFT) eigenvalue. When the target file is an audio-type file, in addition to the information such as the name and the extension of the target file, the foregoing file feature information may further include information such as a tag carried in the audio-type file.

Further, the related information of the foregoing target file may further include application feature information of the target application. The application feature information may specifically include a name of the target application and/or a name of an interface and the like currently displayed when the terminal downloads the target file. In addition, the related feature information of the target application may further include a receiving time of the target file (such as a receiving date). This is not limited in this embodiment of this application.

Figure 2:
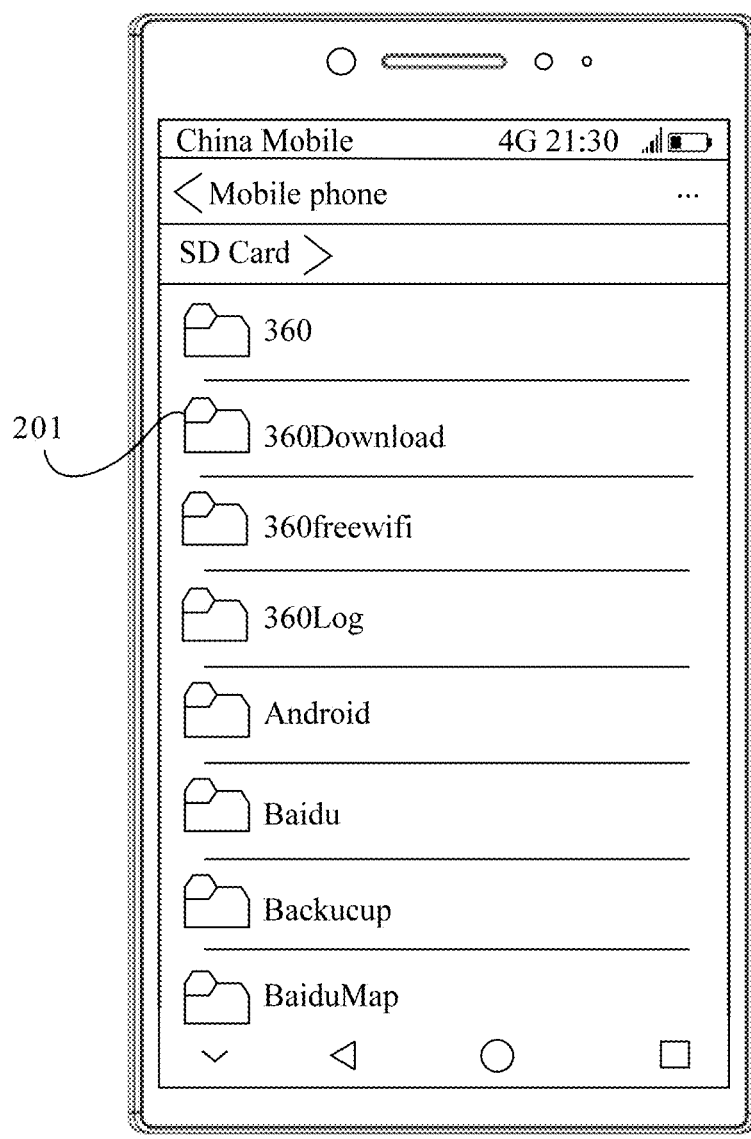
FIG. 2 is a schematic diagram of an application scenario of a file management method according to an embodiment of this application.

For example, a file (for example, a picture, a document, a video, or audio) in the mobile phone 100 may be stored in a folder of the memory 103. Usually, the processor may create one or more folders in the memory 103. The one or more folders are used to store data related to an application (for example, information such as user data, a configuration parameter, or the like that needs to be used when the application is run), store the target file, and the like. As shown in FIG. 2, a target application named a 360 mobile assistant has the file download function. In this way, when the processor 101 of the mobile phone 100 runs the 360 mobile assistant, if a download operation triggered by the user for a target file is detected, an application process that is of the processor 101 and that runs the 360 mobile assistant may instruct the mobile phone to perform an operation of downloading the target file, and store the downloaded target file into a folder 201, named "360Download", in an SD card.

Certainly, the folder 201 named "360Download" may further include a plurality of folders, for example, include a folder 1 named "music" and a folder 2 named "picture". The processor 101 may store downloaded music into the folder 1, and store a downloaded picture into the folder 2.

It should be noted that when the terminal stores the target file obtained by using the target application, the processor may run the target application to store the target file into a corresponding folder in the memory, or the processor may run a system service process provided in a terminal operating system to store the target file into a corresponding folder in the memory. In the prior art, when storing the target file, the terminal does not record a storage path and related feature information of the target application that are of the target file. Therefore, when the terminal subsequently needs to search for the target file, the terminal still needs to locate a storage location of the target file in the terminal.

In this embodiment of this application, after the processor 101 stores the target file received (including downloaded) through the target application into the corresponding folder, the processor 101 may further extract file feature information of the target file (for example, a name or an extension of the target file) and application feature information of the target application (for example, a name of the target application or a name of an interface displayed when the target file is being downloaded), to quickly find the specific storage location of the target file to facilitate the user to manage the target file.

Certainly, the processor 101 may alternatively extract file feature information of the target file and application feature information of the target application after the processor 101 stores the target file and detects that the user performs an operation such as an opening operation on the target file.

In this way, the processor 101 may determine, based on the application feature information of the target application, an appropriate search path. For example, the target application is the 360 mobile assistant and a folder corresponding to the 360 mobile assistant in the memory 103 is the folder 201 named "360Download". Therefore, the folder 201 may be used as the search path of the target file. Further, the processor 101 may use the foregoing file feature information of the target file as an index to quickly locate an actual storage path of the target file in the folder 201. For example, the storage path is: Sdcard/360Download/picture/.

Further, after determining the storage path of the target file, the processor 101 may instruct the display 104-2 to display a prompt on a currently displayed application interface to prompt the user to perform file management on the target file. For example, as shown in FIG. 3(*a*), the currently running target application is the WeChat application, and the processor 101 receives a Word file 301 (namely, the target file) named "bus schedule for August" from a friend A through the WeChat application. In this case, the processor 101 may determine, based on application feature information of the WeChat application and file feature information of the foregoing Word file 301, that an actual storage path of the Word file 301 is: Sdcard/weixin/Download/01. Therefore, as shown in FIG. 3(*b*), the processor 101 may instruct the display 104-2 to display a floating prompt window 302 on a current display interface of the WeChat. The prompt window 302 may prompt the user that the Word file 301 has been found in Sdcard/weixin/Download/01. The user may implement a management function such as sharing, moving, or compressing on the Word file 301 by triggering a file management control such as a sharing key 31, a moving key 32, or a compressing key 33 in the prompt window 302.

It can be learned that in this embodiment of this application, when an application is running in the terminal, if the terminal obtains the downloaded or transferred target file through the application, the terminal may quickly locate a specific storage path of the target file, to provide, on a current display interface of the application, a quick entry at which cross-application management may be performed on the target file to the user. The user does not need to manually search a full disk for the target file, to improve file management efficiency in the terminal.

A method in which the terminal determines the actual storage path of the foregoing target file and a specific method in which the terminal prompts that cross-application management is performed on the target file are described in detail with reference to the related accompanying drawings in the subsequent embodiments. Therefore, details are not described herein again.

Figure 4:
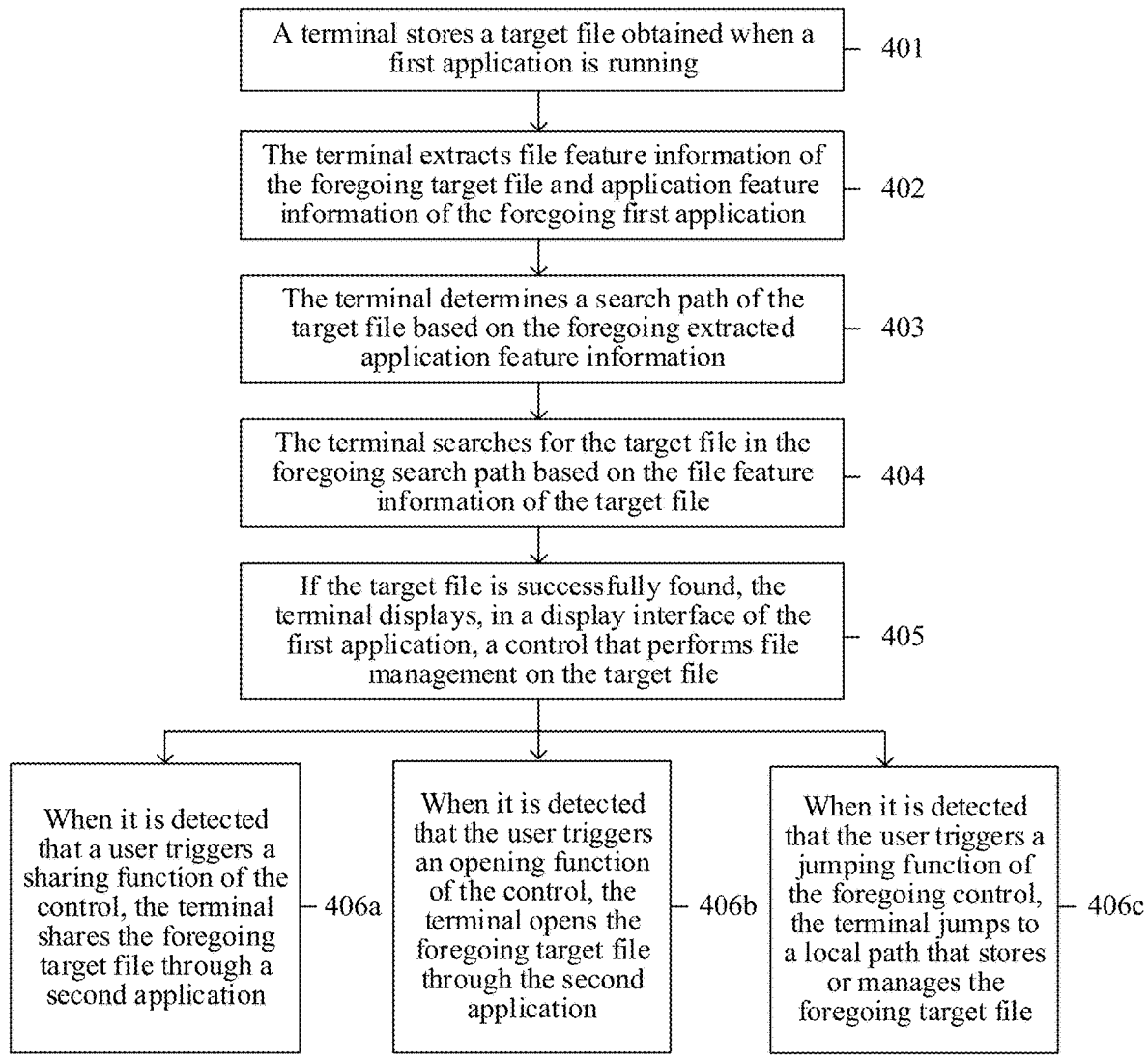
FIG. 4 is a schematic flowchart of a file management method according to an embodiment of this application.

As shown in FIG. 4, an embodiment of this application provides a file management method. The method includes the following operations.

401. A terminal stores a target file obtained when a first application is running.

The foregoing target file may be a file such as a document, a picture, a video, or audio obtained by receiving or downloading through the first application by the terminal. The foregoing first application may be any application that has been installed in the terminal and that has a file transfer function or a file download function. This is not limited in this embodiment of this application.

Figure 5:
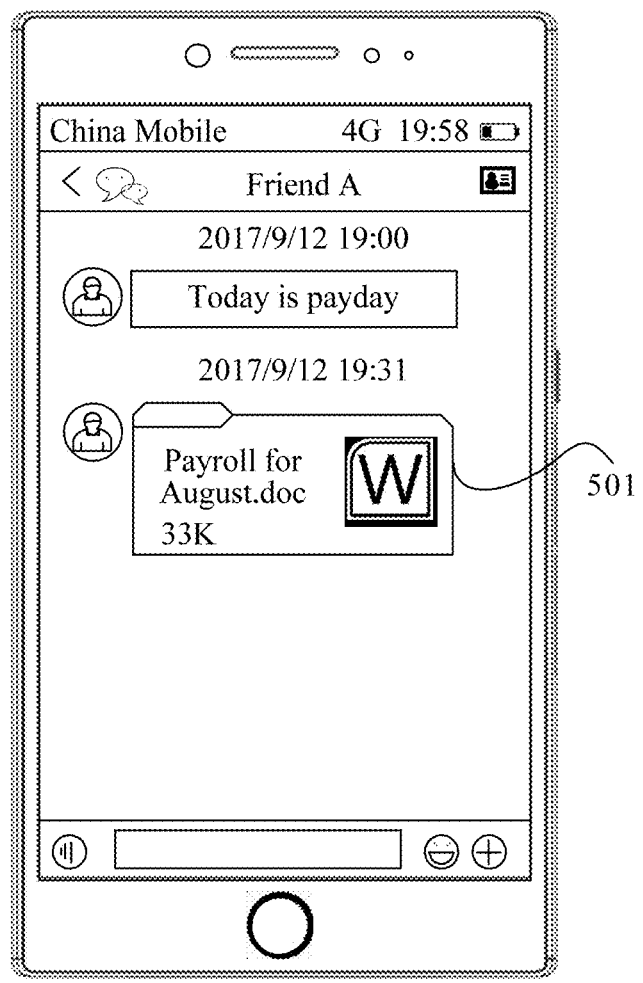
FIG. 5 is a schematic diagram of an application scenario of a file management method according to an embodiment of this application.

For example, as shown in FIG. 5, a user B is chatting with a friend A by using the WeChat application. A terminal of the friend A sends a Word file 501 named "payroll for August" to a terminal of the user B by using a file transfer function of the WeChat application. The Word file 501 may be displayed on a chat interface with the friend A in a form of a control. In this case, the first application is a first application run by the terminal in the foreground. A target file obtained by using the WeChat application is the Word file 501 named "payroll for August".

In a possible embodiment, when a target application (for example, the foregoing WeChat application) transfers a file, the target application may directly transfer the target file (for example, the foregoing Word file 501) to a folder in the terminal. In this case, after the foregoing Word file 501 is transferred, it indicates that the terminal has stored the target file.

In another possible embodiment, when transferring the target file, the terminal may first upload the to-be-transferred target file to a server of the target application, and information such as a thumbnail and a file name of the target file is displayed in the terminal. After the terminal receives an opening or downloading operation entered by the user, downloading the target file from the server of the target application by the terminal may be triggered, so that the target file is stored into a folder in the terminal.

402. The terminal extracts file feature information of the foregoing target file and application feature information of the foregoing first application.

An action of extracting the foregoing file feature information and the foregoing application feature information by the terminal may be triggered automatically after the terminal has stored the foregoing target file, or may be triggered in response to a user gesture. This is not limited in this embodiment of this application.

An example in which extracting the foregoing file feature information and the application feature information by the terminal is triggered by the user gesture is used. The user gesture may be a specific gesture set for a file management function provided in this application, and namely, the user gesture corresponds to an operation of extracting the file feature information and the application feature information, or the user gesture may be a conventional gesture used to manage the target file in the target application. For example, an operation of tapping a control of the Word file 501 by the user may not only trigger the terminal to open the Word file 501, but also trigger the terminal to extract the file feature information and the application feature information. In this way, the file management function provided in this application can be implemented when a function of the target application and the terminal can be compatible with each other.

Figure 6:
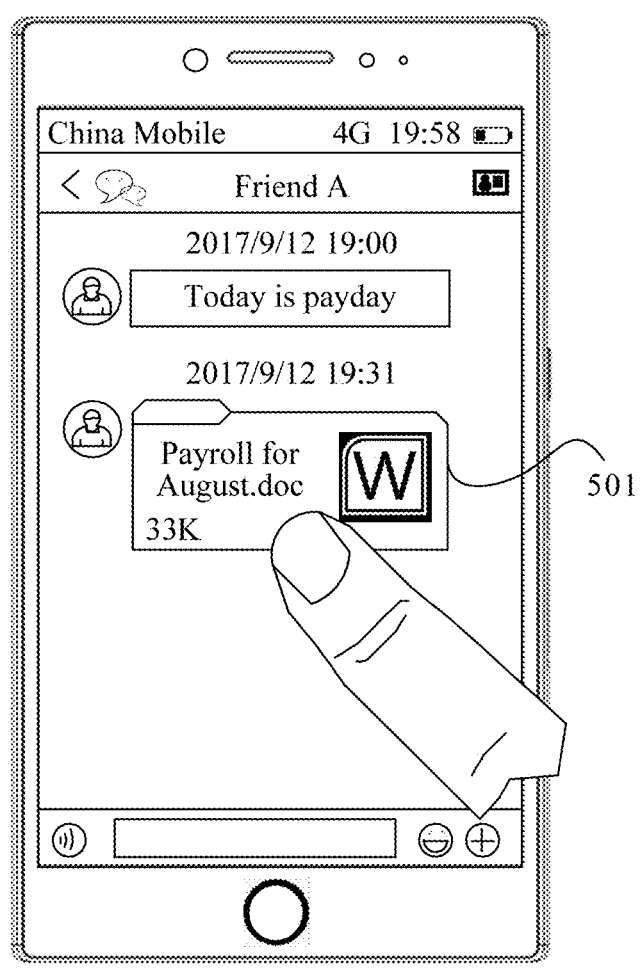
FIG. 6 is a schematic diagram of an application scenario of a file management method according to an embodiment of this application.

For example, as shown in FIG. 6, after the terminal obtains the Word file 501 transferred by the friend A in the WeChat application, the user may perform a specific gesture such as tapping, double-tapping, or touching and holding on the control of the Word file 501. After detecting the specific gesture, the terminal extracts file feature information of the Word file 501 and application feature information of the WeChat application.

Specifically, when the target file is a document such as the foregoing Word file 501, the file feature information of the target file may specifically include a name of the document such as "payroll for August" or an extension of the document such as ".doc". These pieces of file feature information may be subsequently used as an index for searching for a specific storage path of the target file.

When the target file is a picture, in addition to a name and an extension of the picture, the file feature information of the target file may further include a picture eigenvalue that reflects specific display content of the picture, for example, an SIFT eigenvalue. The SIFT eigenvalue can reflect the specific display content of the picture, and the SIFT eigenvalue is irrelevant with a zooming degree of the picture. In other words, a same picture in different zooming degrees can be represented by using a same SIFT eigenvalue. Therefore, the terminal may subsequently search for the specific storage path of the target file by using an extracted SIFT eigenvalue of a thumbnail.

When the target file is audio, in addition to a name and an extension of the audio, the file feature information of the target file may further include tag information carried in the audio. Usually, some attribute information of the audio file, for example, a name of the song, a name of the singer, a name of the disc, and the year, is recorded in a head portion or a tail portion of the audio file. Such attribute information is the tag information of the audio.

Figure 7:
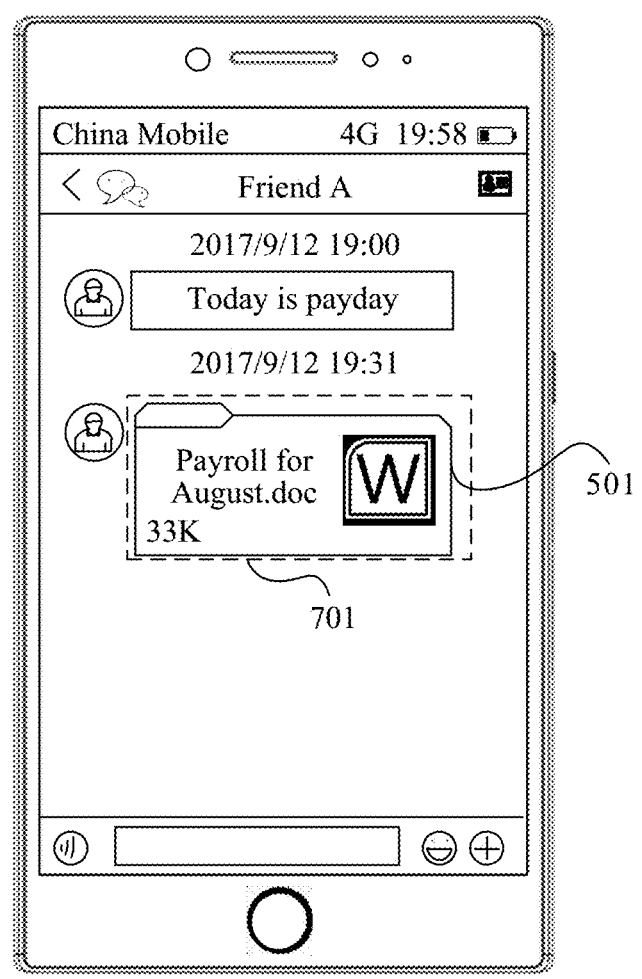
FIG. 7 is a schematic diagram of an application scenario of a file management method according to an embodiment of this application.

For example, as shown in FIG. 7, after the user performs the specific gesture on the control of the Word file 501 transferred through the WeChat application, the terminal may be triggered to capture an image displayed at a location of the control (namely, a dashed-line box 701 in FIG. 7), to extract information such as a word and an image in the image and identify the file feature information of the target file.

Alternatively, after the user performs the specific gesture on the control of the Word file 501 transferred through the WeChat application, the WeChat application may be triggered to provide the file feature information such as the name and the extension of the received target file to an operating system of the terminal through a related interface, so that the terminal obtains the file feature information of the target file.

In addition, after receiving the foregoing target file, the terminal may further extract the application feature information of the first application that transfers the target file, for example, a name of the foregoing first application and/or a name of a currently displayed interface when the target file is being downloaded.

For example, the name of the first application may be specifically a package name of the first application. In an Android operating system, the terminal may obtain the package name of a currently running first application by calling a getAppPackageName( ) function.

For another example, the name of the currently displayed interface when the target file is being downloaded may be specifically a name of a running activity when the target file is being downloaded. For example, an activity 1 is used to indicate the chat interface of the WeChat application, and an activity 2 is used to indicate a favorites interface of the WeChat application. In the Android operating system, the terminal may obtain a name of a currently displayed activity by calling a getRunningActivityName( ) function.

It should be noted that a person skilled in the art may set specific content of the file feature information of the foregoing target file and the application feature information of the first application based on an actual application scenario or actual experience. This is not limited in this embodiment of this application.

For example, the processor of the terminal may create a different folder based on a receiving date of receiving the target file by the application, and store the target file into the folder of the corresponding date. Therefore, when extracting the application feature information of the first application, the terminal may further use a receiving time (for example, the receiving date) of the target file as the application feature information of the first application.

403. The terminal determines a search path of the target file based on the foregoing extracted application feature information.

A file that is in the terminal and that is received through a different application is stored into a folder corresponding to the application, and the foregoing application feature information includes the name of the first application. Therefore, the terminal may determine that the folder corresponding to the name of the first application is a target folder storing the foregoing target file. For example, files received through the WeChat application are all stored into a folder named "weixin" of an SD card. Therefore, the terminal may determine Sdcard/weixin/ as the search path of the foregoing Word file 501 (namely, the target file).

In addition, the terminal may further learn, based on a searching result of searching for the target file each time, a specific storage path in which the terminal receives a file through each application, to optimize the foregoing search path based on a learning result. For example, when receiving, for the first time, a target file 1 transferred through the WeChat application, the terminal may determine the entire SD card as a search path of the target file 1. If a storage path that is of the target file 1 and that is finally found is: Sdcard/weixin/, when the terminal subsequently receives a target file 2 transferred through the WeChat application again, the terminal may determine, based on the storage path of the foregoing target file 1, Sdcard/weixin/as a search path of the target file 2, and search for the target file 2 in the folder named "weixin" in the SD card. In this way, the terminal may improve, based on searching experience each time, accuracy of determining the search path by the terminal, to quickly locate the specific storage path of the target file in the terminal.

Further, if the name of the currently displayed interface when the target file is being downloaded is further recorded in the application feature information extracted by the terminal, for example, the name of the activity run by the terminal when the foregoing Word file 501 is received, the terminal may further learn a search path corresponding to a file obtained by each application in a different type of a display interface. For example, the terminal receives a target file 3 through the chat interface of the WeChat application, and the terminal may determine, based on the package name of the WeChat application, Sdcard/weixin/ as a search path of the target file 3. After the searching, the terminal finds the target file 3 in Sdcard/weixin/001/, and namely, files received through the chat interface of the WeChat application is usually stored into a folder named "001" in the folder named "weixin". Therefore, when subsequently receiving a target file 4 through the chat interface of the WeChat application again, the terminal may determine Sdcard/weixin/001/ as a search path of the target file 4, and search for the target file 4 in the folder named "001" in the folder named "weixin" in the SD card.

Specifically, the terminal may maintain a correspondence between application feature information and search paths shown in Table 1. In this way, after obtaining the application feature information of the first application, the terminal may use the search path that corresponds to the application feature information of the first application and that is in Table 1 as the search path in which the foregoing target file is searched for.

TABLE 1

| Application feature information | | |
|---|---|---|
| Application package name | Activity name | Search path |
| weixin | Activity 1 | Sdcard/weixin/001/ |
|  | Activity 2 | Sdcard/weixin/002/ |
| Weibo | Activity 3 | Sdcard/weibo1/picture/ |
|  | Activity 4 | Sdcard/weibo1/music/ |

Figure 8:
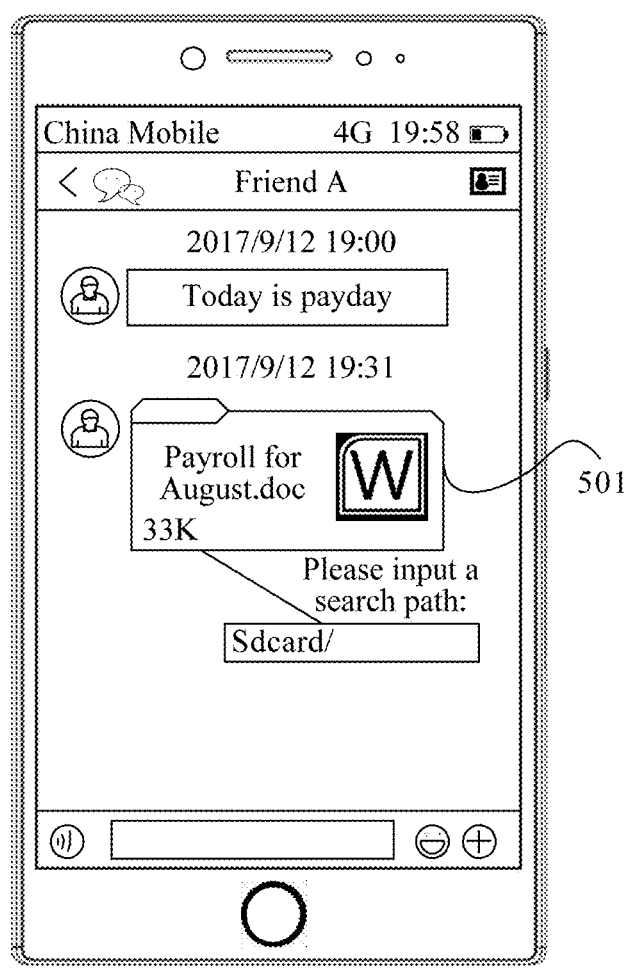
FIG. 8 is a schematic diagram of an application scenario of a file management method according to an embodiment of this application.

If the search path corresponding to the application feature information that is of the first application and that is extracted this time is not recorded in Table 1, or the terminal does not find the target file in the search path determined in step 403, the terminal may use the entire SD card or the entire memory of the terminal as the search path of the target file or use a default download path of a system (for example, Sdcard/downloads/) as the search path of the target application, or as shown in FIG. 8, the terminal may further prompt the user to manually input the search path of the target file in a current display interface of the first application. This is not limited in this embodiment of this application.

After successfully finding a target file, the terminal may use a specific storage path (for example, Sdcard/weixin/001/) of the target file as the search path corresponding to the application feature information of the target file, and update the search path in Table 1. When subsequently extracting application feature information of a new target file, the terminal may determine a search path of the new target file by querying Table 1. If the terminal cannot find the foregoing target file, the terminal may prompt the user to manually search for the target file in the terminal.

In addition, an example in which the terminal learns the search path of the target file based on the extracted application package name and activity name is merely used for description in the foregoing embodiment. It may be understood that the terminal may further learn the search path of the target file based on other information recorded in the application feature information, for example, a parameter such as a time at which the terminal receives the target file through the first application. This is not limited in this embodiment of this application.

Figure 9:
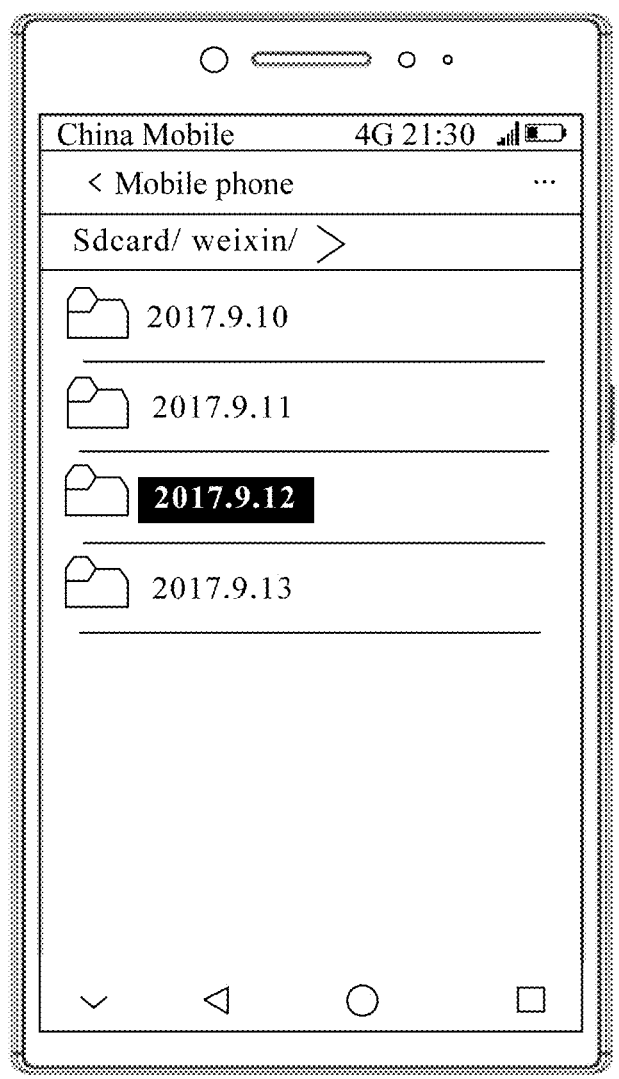
FIG. 9 is a schematic diagram of an application scenario of a file management method according to an embodiment of this application.

For example, a file received by the terminal through the WeChat application may be stored, based on a specific receiving date, into a corresponding folder created for the file. For example, the terminal stores a file received on Aug. 22, 2017 into a folder 1 named "2017.8.22", and stores a file received on Sep. 12, 2017 into a folder 2 named "2017.9.12". Therefore, as shown in FIG. 9, after receiving the Word file 501 through the WeChat application, the terminal may further record a specific time such as 2017.9.12 at which the Word file 501 is received in the application feature information of the Word file 501. In this way, the terminal may determine, based on the specific time at which the Word file 501 is received: 2017.9.12, that a search path of the Word file 501 is: Sdcard/weixin/2017.9.12/, namely, the foregoing folder 2.

404. The terminal searches for the target file in the foregoing search path based on the file feature information of the target file.

In operation 404, after determining the search path of the target the file (for example, Sdcard/weixin/), the terminal may use the file feature information of the target file, for example, the name of the Word file 501 "payroll for August" and the extension of the Word file 501 ".doc" as indexes, and search for the target file in the foregoing search path: Sdcard/weixin/, to determine the specific storage path of the Word file 501, and for example, the storage path that is of the target file and that is finally found is Sdcard/weixin/001/.

After successfully finding the storage path of the target file, the terminal may update the search path that is in Table 1 and that corresponds to the application feature information of the first application, so that when subsequently receiving a new target file, the terminal may quickly determine a search path of the newly received target file based on an updated search path, and locate the newly received target file.

In addition, after successfully finding the storage path of the target file, the terminal may further store a correspondence between the target file and the storage path of the target file, for example, a correspondence between the foregoing Word file 501 and the storage path: Sdcard/weixin/001/. In this way, when subsequently searching for the target file again, the terminal may correctly locate a storage location of the target file at one time based on the correspondence between the target file and the storage path of the target file.

Figure 10:
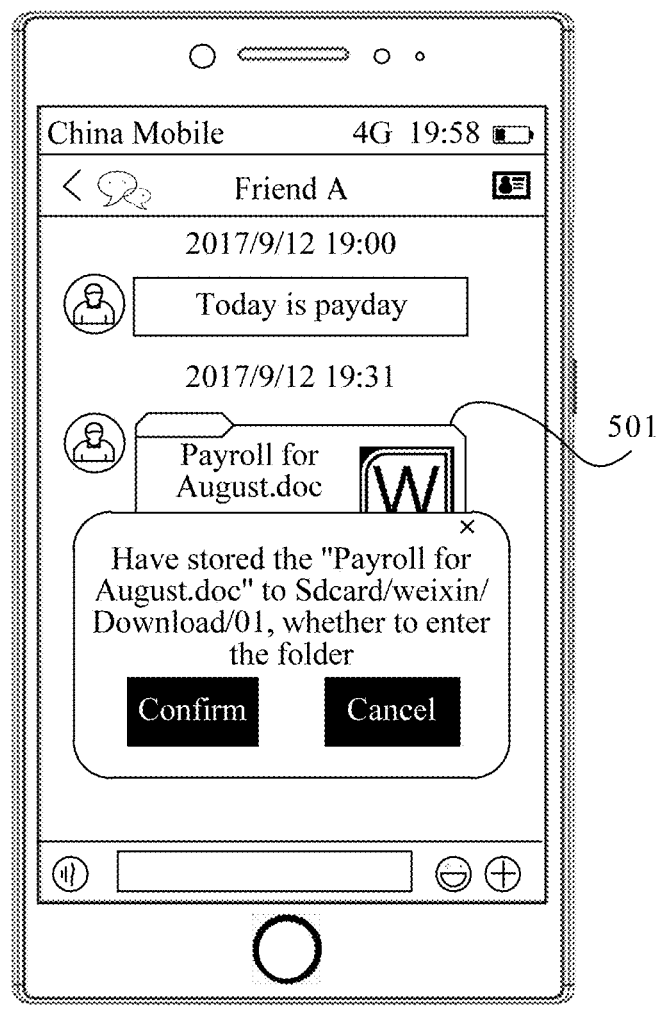
FIG. 10 is a schematic diagram of an application scenario of a file management method according to an embodiment of this application.

Further, when successfully finding the storage path of the target file, the terminal may further display the found storage path of the target file on a current display interface, so that the user may correctly locate the target file based on the storage path when the user manually searches for the target file. As shown in FIG. 10, after finding the foregoing Word file 501, the terminal may prompt the user that the storage path of the Word file 501 is: Sdcard/weixin/001/ by using a floating window on the current display interface of the WeChat application. The user may select, based on this prompt, whether to enter the storage path of the target file. In this way, after receiving the target file through the WeChat application, by performing a specific gesture on the target file, the user may trigger the terminal to quickly locate the received target file, and the user may learn of the storage path of the target file without switching to another interface or application.

405. If the target file is successfully found, the terminal displays, in a display interface of the first application, a control that performs file management on the target file.

In operation 405, after the terminal successfully finds a specific storage location of the target file, to facilitate the user to conveniently and quickly manage the target file that is received through the first application, the terminal may display, on a current display interface of the first application, a prompt window that is used to manage the target file, and in other words, the terminal provides a file management entry set for the received target file to the user on the display interface of the first application.

Figure 11:
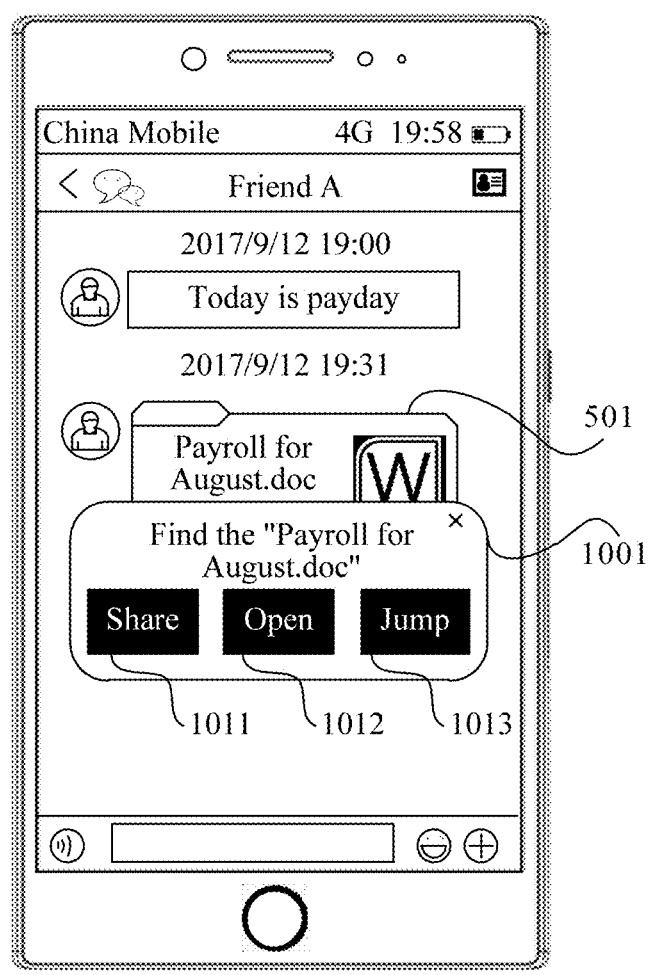
FIG. 11 is a schematic diagram of an application scenario of a file management method according to an embodiment of this application.

For example, the specific storage location that is found by the terminal and that is of the Word file 501 sent by the friend A in the WeChat application is Sdcard/weixin/001/. Further, as shown in FIG. 11, the terminal may display a prompt window 1001 on a current chat interface with the friend A, and a related control that manages the Word file 501 is disposed in the prompt window 1001. For example, the control includes a shortcut key 1011 used to share the Word file 501 with another application, a shortcut key 1012 used to open the Word file 501 by using the another application, and a shortcut key 1013 used to jump to a storage path of the Word file 501.

It can be learned that the terminal has found the specific storage location of the target file, and therefore, the user may implement, by triggering a corresponding control, a management operation such as sharing, opening, or jumping of the terminal on the target file. In this way, after receiving the target file by using the first application, the user may manage the target file without switching to a file manager and searching for the target file. Therefore, file management efficiency in the terminal is significantly improved.

It should be noted that in FIG. 11, an example in which three management operations including sharing, opening, and jumping are performed on the target file is merely used for description. It may be understood that the control that manages the target file by deleting, moving, and compressing the target file may further be displayed on the display interface of the first application. This is not limited in this embodiment of this application.

Figure 12:
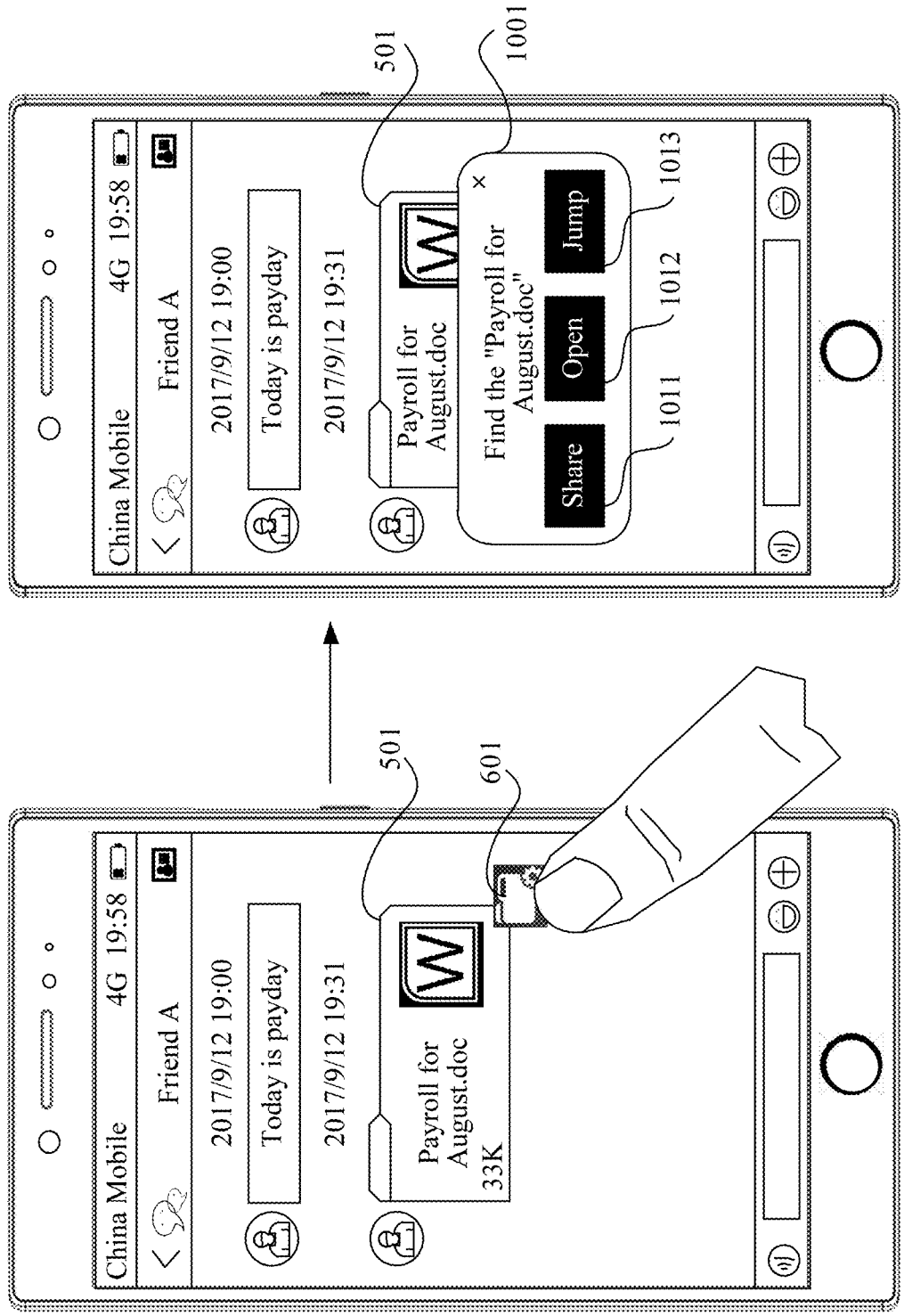
FIG. 12 is a schematic diagram of an application scenario of a file management method according to an embodiment of this application.

In addition, the foregoing prompt window 1001 may alternatively be displayed around the target file in a form of a relatively small control. For example, as shown in FIG. 12, the terminal may display a file management control 601 next to the Word file 501. After it is detected that the user triggers the control 601, the terminal expands the foregoing prompt window 1001 and displays the prompt window 1001 on the current chat interface with the friend A, to prevent the prompt window 1001 from covering much of the display content of the first application.

406*a*. When it is detected that the user triggers a sharing function of the foregoing control, the terminal shares the foregoing target file through a second application.

The foregoing second application is any installed application supporting the file sharing function other than the first application of the terminal. The sharing function may be specifically sending the target file to another terminal or user through the second application (for example, Bluetooth), or may be loading the target file as an attachment into a display interface of the second application (for example, WeChat or Microblog). This is not limited in this embodiment of this application.

Figure 13:
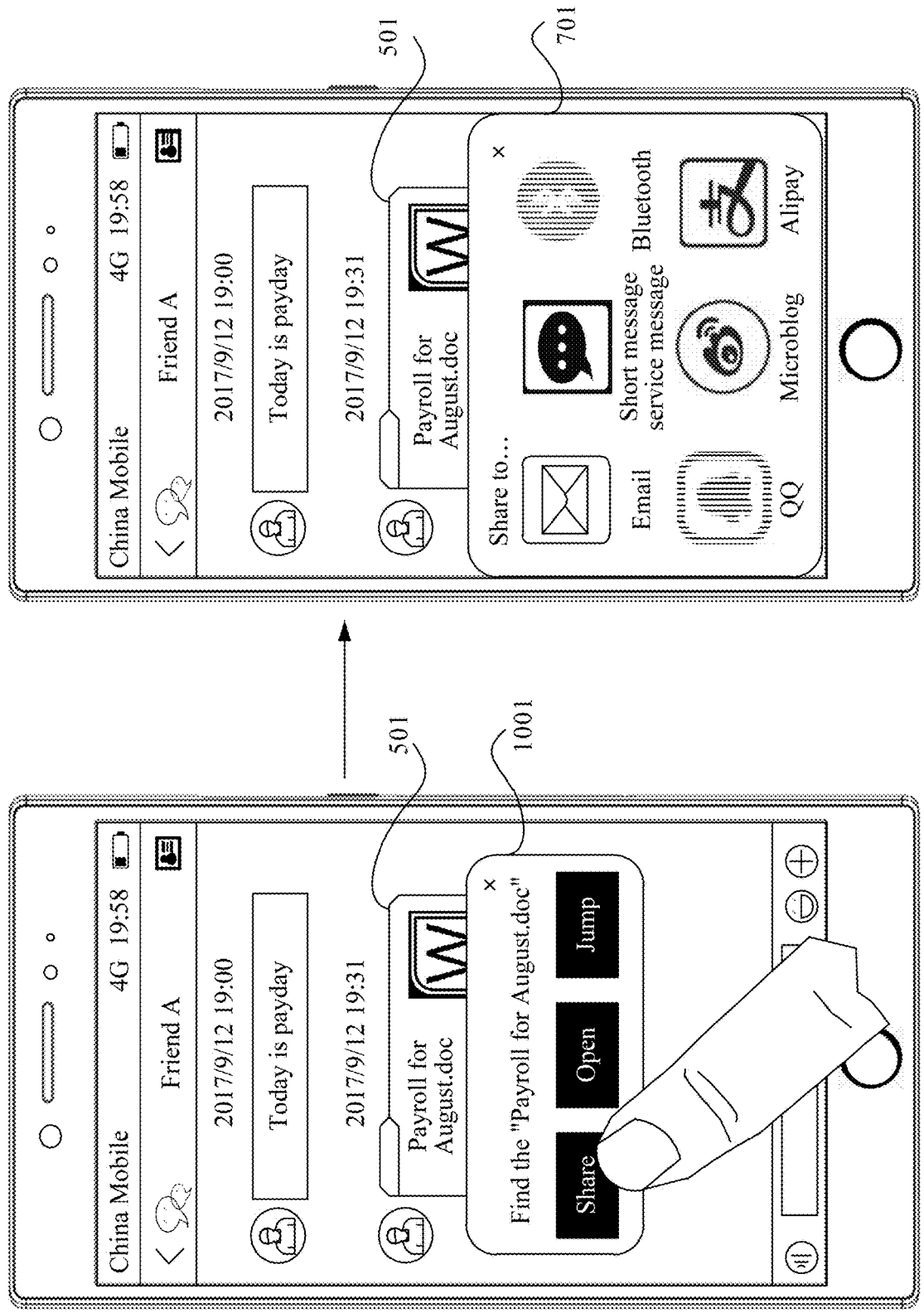
FIG. 13 is a schematic diagram of an application scenario of a file management method according to an embodiment of this application.

For example, as shown in FIG. 13, after finding the specific storage location of the Word file 501 sent by the friend A, the terminal displays, on the current chat interface with the friend A, the prompt window 1001 that includes a "sharing" shortcut key. When the terminal detects that the user taps the "sharing" shortcut key, the terminal may display an application list 701 that supports sharing the Word file 501 and that is in the terminal. In this way, after selecting a corresponding application in the application list 701, the user may share the Word file 501 with another application based on the specific storage location of the Word file 501. For example, after the terminal detects that the user taps an email control in the application list 701, the terminal may be triggered to open an email, and the Word file 501 is automatically added as an attachment to a display interface in which an email is written, to facilitate the user to quickly share the received file in the WeChat application with another application.

Figure 14A:
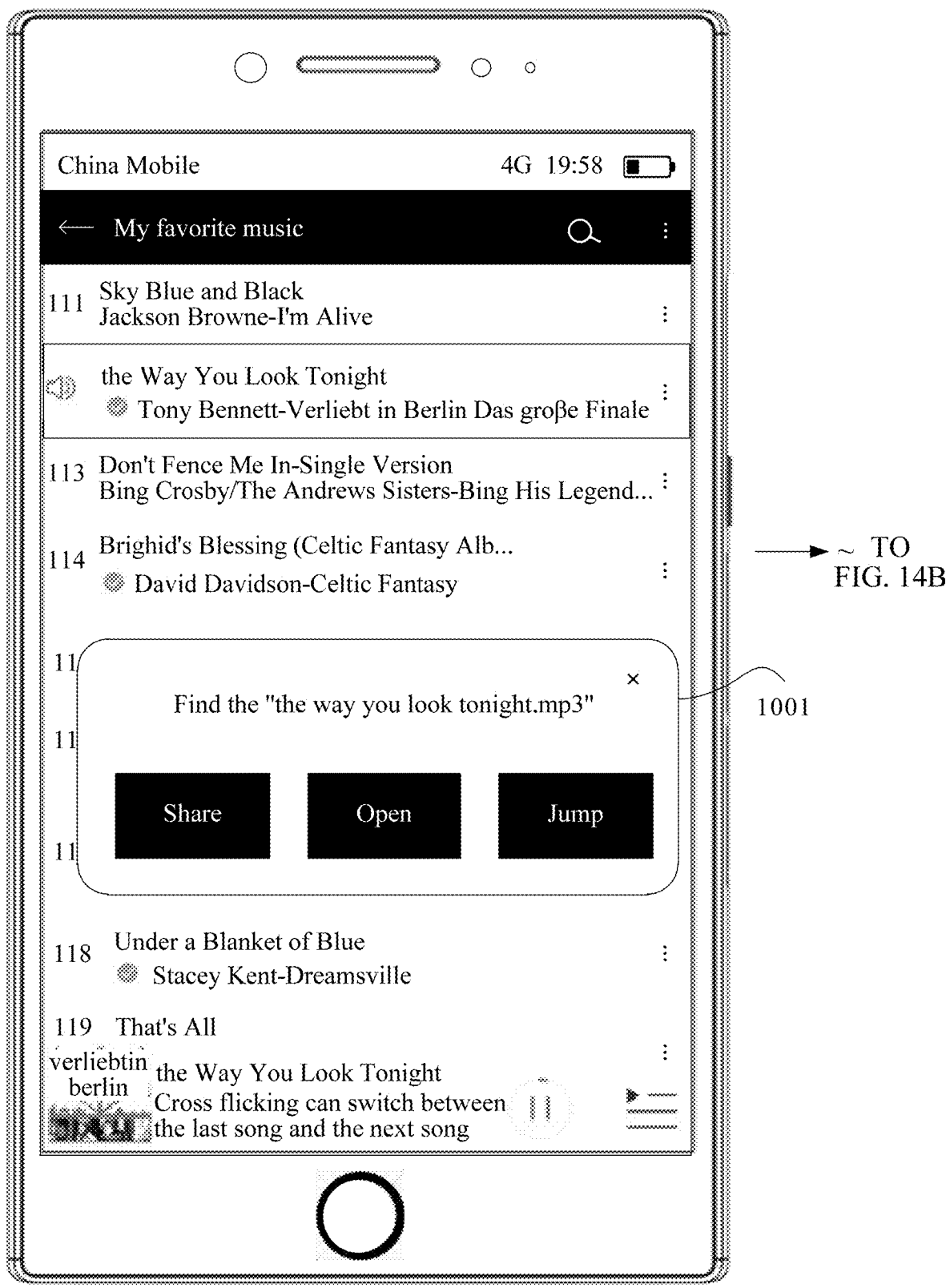
FIGS. 14A and 14B are a schematic diagram of an application scenario of a file management method according to an embodiment of this application.
Figure 14B:
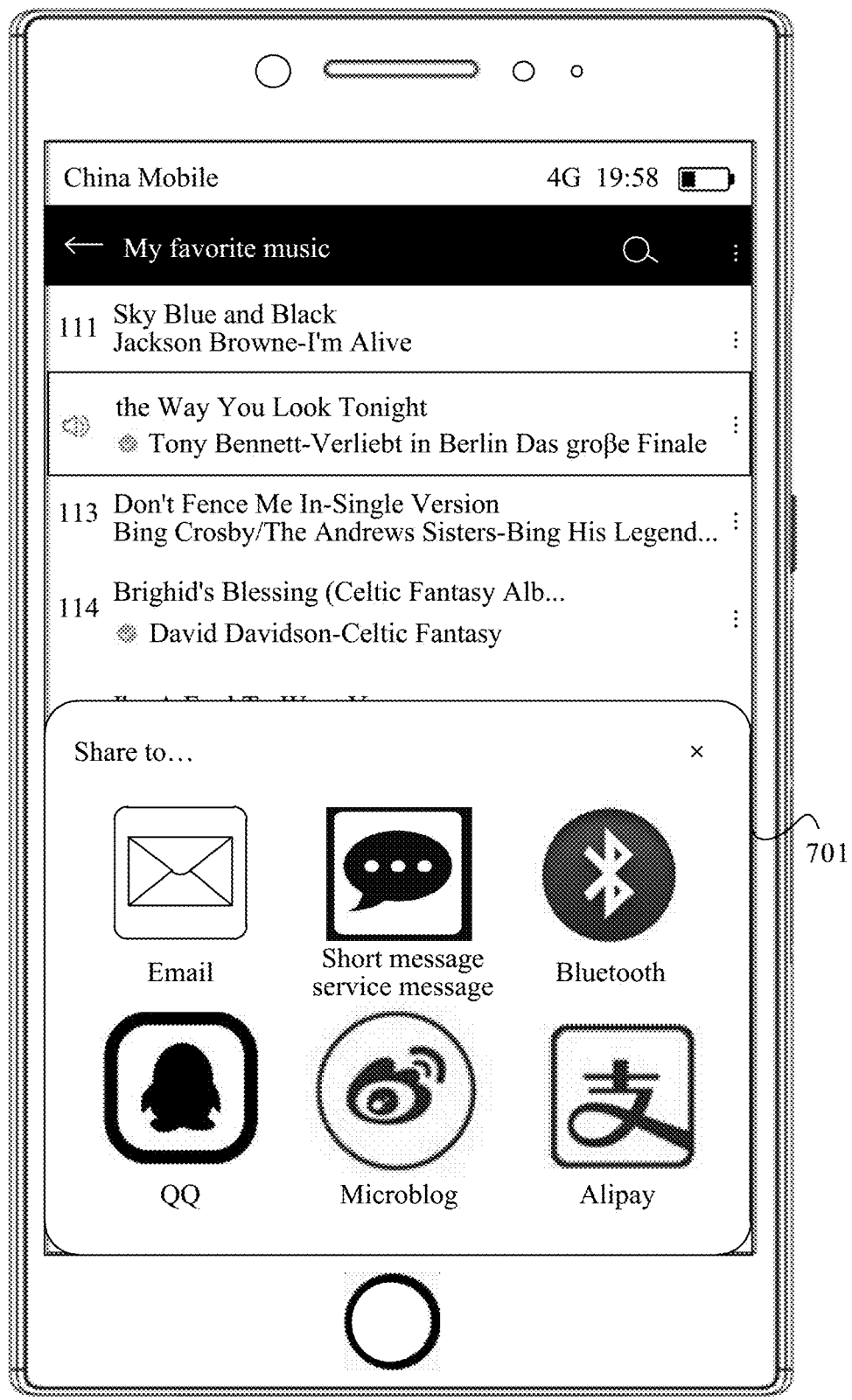

Alternatively, as shown in FIGS. 14A and 14B, after finding a specific storage location of a song "the way you look tonight" in a music application, the terminal may further display, in a current music list, the prompt window 1001 that includes the "sharing" shortcut key. When the terminal detects that the user taps the "sharing" shortcut key, the terminal may display the application list 701 that supports sharing songs and that is in the terminal. In this way, the user may select a corresponding application in the application list 701 to share the song "the way you look tonight". For example, after the terminal detects that the user taps a Bluetooth control in the application list 701, the terminal may be triggered to enable Bluetooth and share the song "the way you look tonight" with another user through the Bluetooth.

Figure 15:
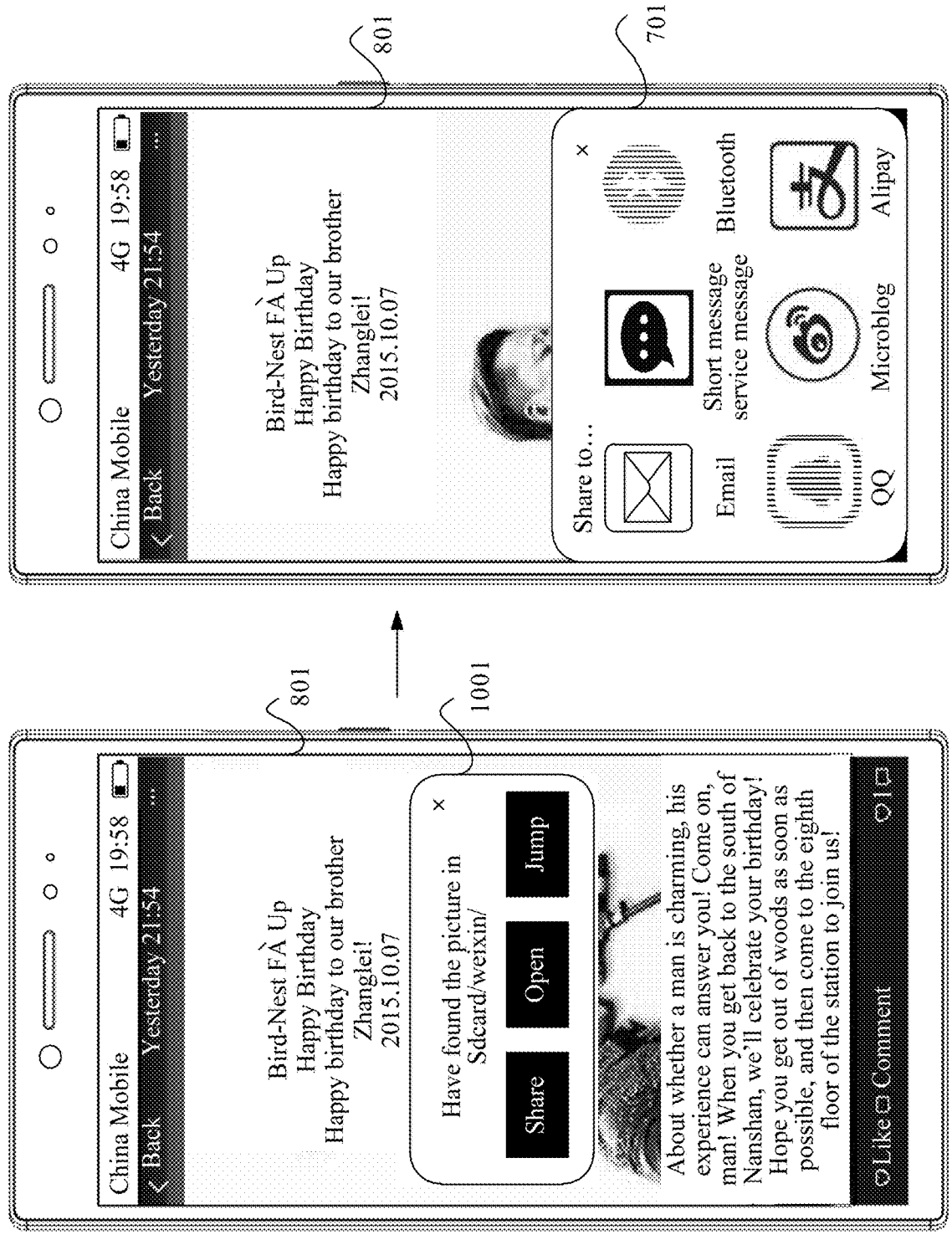
FIG. 15 is a schematic diagram of an application scenario of a file management method according to an embodiment of this application.

Alternatively, as shown in FIG. 15, the user downloads a picture 801 by using a Moments function of WeChat. After finding a specific storage location of the picture 801, the terminal may further display, on a current display interface of the Moments, the prompt window 1001 that includes the "sharing" shortcut key. When the terminal detects that the user taps the "sharing" shortcut key, the terminal may display an application list 701 that supports sharing pictures and that is in the terminal. In this way, after the user selects a corresponding application in the application list 701, the terminal may forward the picture 801 to another application platform based on the specific storage location of the picture 801. For example, after the terminal detects that the user taps a Microblog control in the application list 701, the terminal may be triggered to switch from a current interface of WeChat Moments to an interface used to post a microblog of the Microblog application, and automatically add the picture 801 to the interface used to post the microblog, to facilitate the user to share a file by switching from the WeChat application to the Microblog application.

406*b*. When it is detected that the user triggers an opening function of the foregoing control, the terminal opens the foregoing target file through the second application.

Similarly, the foregoing second application is any installed application that can open the target file other than the first application of the terminal.

Figure 16:
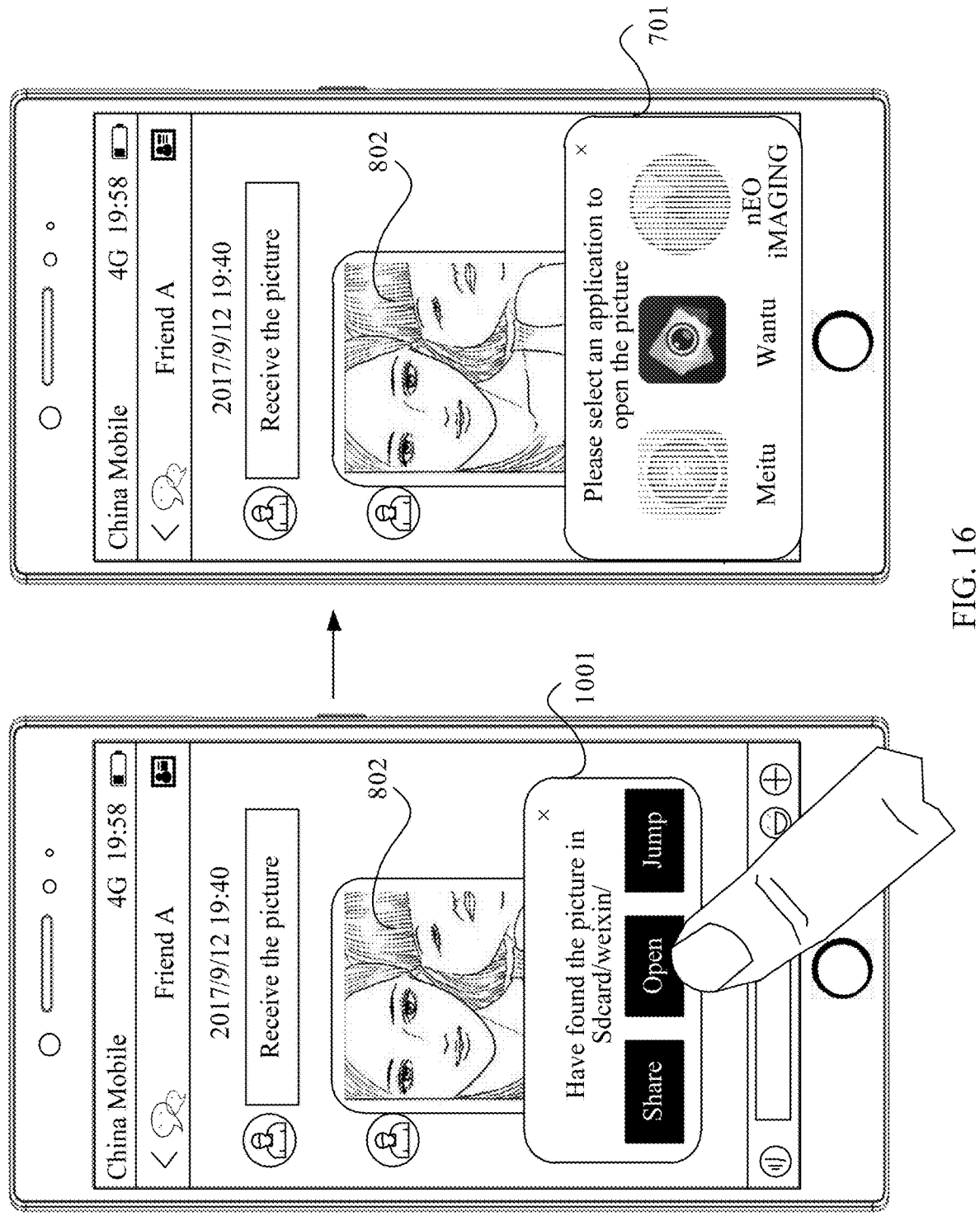
FIG. 16 is a schematic diagram of an application scenario of a file management method according to an embodiment of this application.

For example, as shown in FIG. 16, after receiving, through the WeChat application, a picture 802 sent by the friend A, the terminal may further determine a specific storage location of the picture 802 and display, on the current chat interface with the friend A, the prompt window 1001 that includes an "opening" shortcut key. When the terminal detects that the user taps the "opening" shortcut key, the terminal may display the application list 701 that supports opening the picture 802 and that is in the terminal. In this way, after the user selects a corresponding application in the application list 701, the terminal may open the picture 802 by using another application based on the specific storage location of the picture 802. For example, after the terminal detects that the user taps a control named Meitu in the application list 701, the terminal may be triggered to open the picture 802 by using the Meitu application, to facilitate the user to perform an operation such as beautification on the picture 802 by using the Meitu application.

Figure 17:
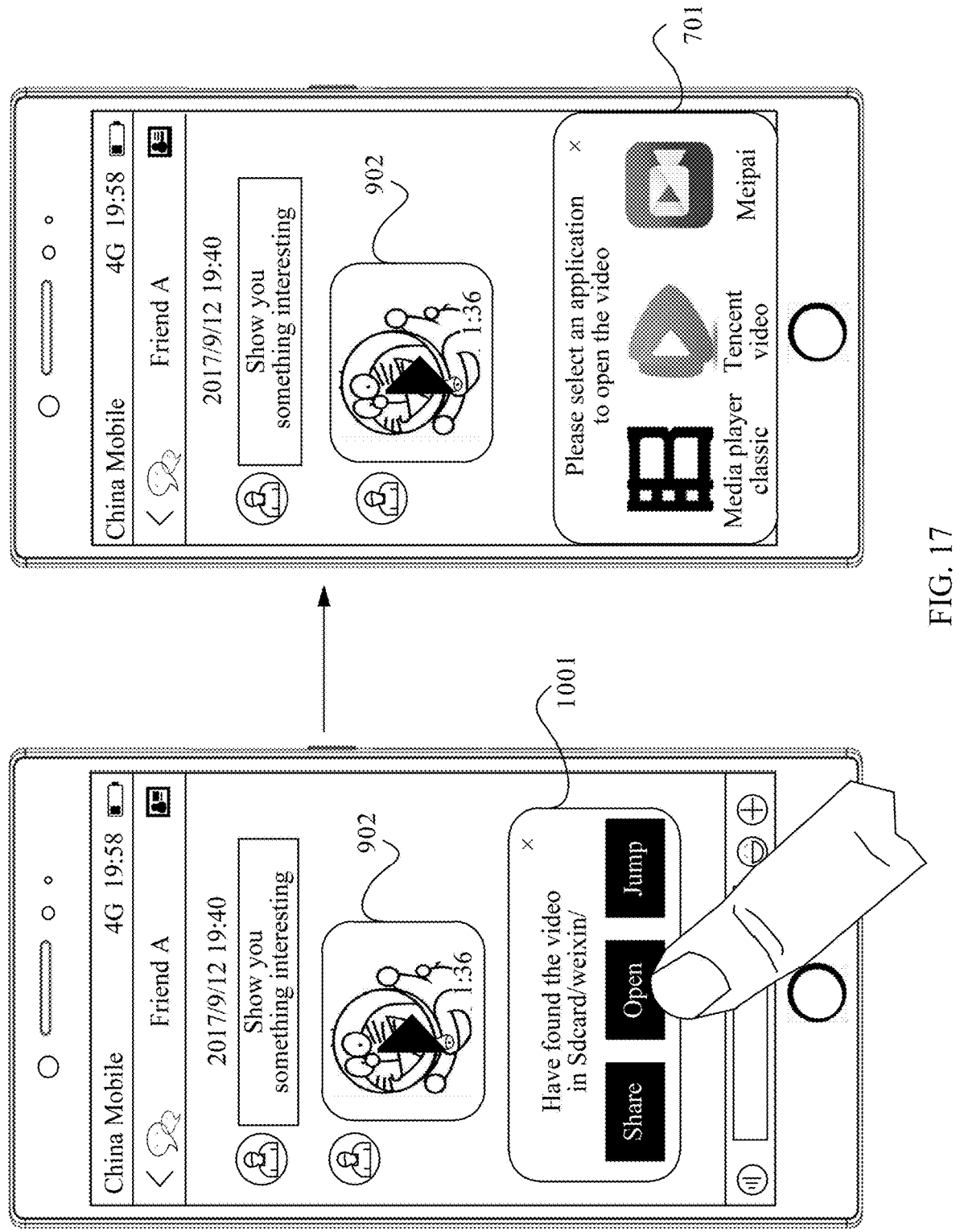
FIG. 17 is a schematic diagram of an application scenario of a file management method according to an embodiment of this application.

Alternatively, as shown in FIG. 17, after receiving, through the WeChat application, a video 902 sent by the friend A, the terminal may further determine a specific storage location of the video 902 and display, on the current chat interface with the friend A, the prompt window 1001 that includes the "opening" shortcut key. When the terminal detects that the user taps the "opening" shortcut key, the terminal may display the application list 701 that supports opening the video 902 and that is in the terminal. In this way, after the user selects a corresponding application in the application list 701, the terminal may play, based on the specific storage location of the video 902, the video 902 by using another application.

It can be learned that in the file management method provided in this embodiment of this application, the terminal determines the specific storage location of the target file, and therefore, the terminal may share and open the target file between different application platforms in time and conveniently by displaying the control that performs the file management on the target file, to facilitate the user to manage the target file between different applications and improve the file management efficiency in the terminal.

406c. When it is detected that the user triggers a jumping function of the foregoing control, the terminal jumps to a local path that stores or manages the foregoing target file.

Figure 18:
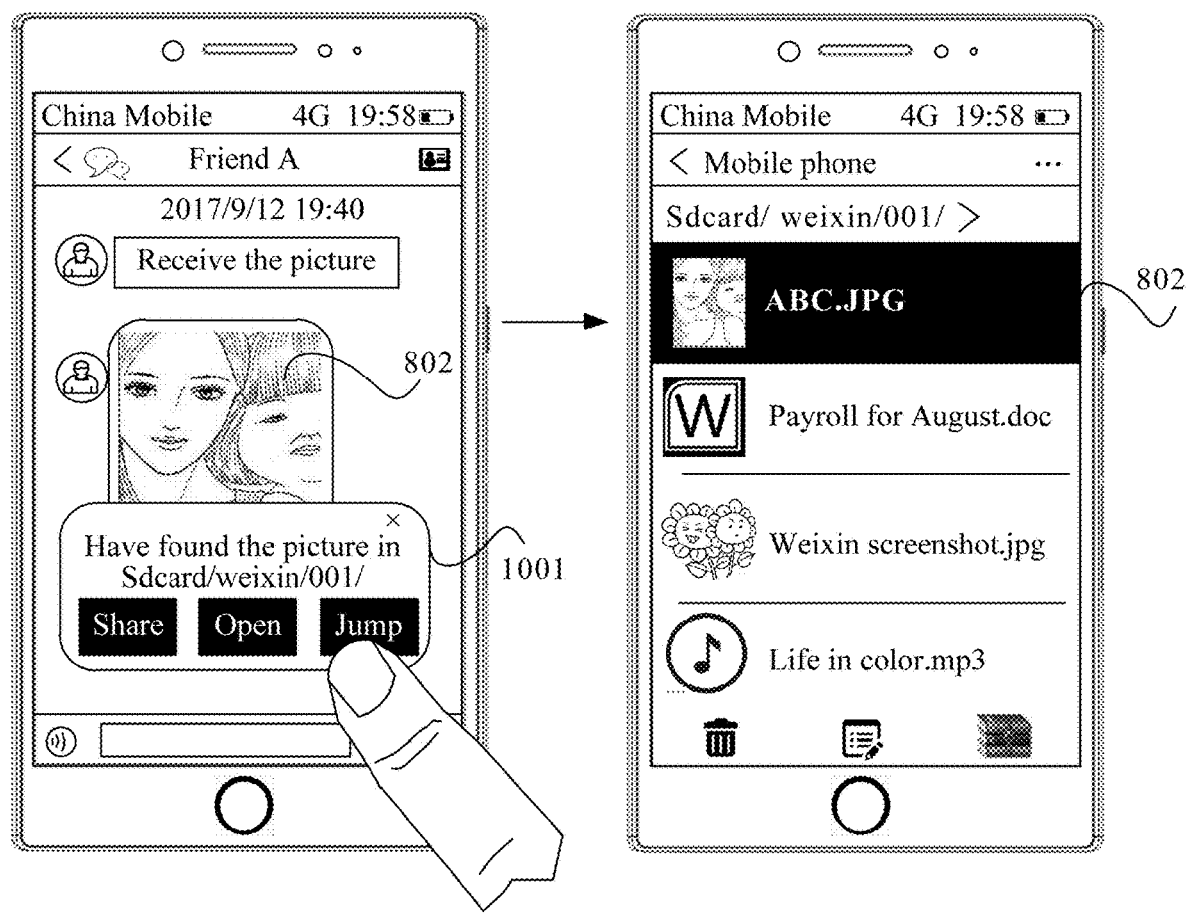
FIG. 18 is a schematic diagram of an application scenario of a file management method according to an embodiment of this application.

For example, as shown in FIG. 18, after receiving, through the WeChat application, the picture 802 sent by the friend A, the terminal may further determine that the specific storage location of the picture 802 is Sdcard/weixin/001/ and further display, on the current chat interface with the friend A, the prompt window 1001 that includes a "jumping" shortcut key. When the terminal detects that the user taps the "jumping" shortcut key, the terminal may jump to a storage path of Sdcard/weixin/001/. The storage path includes the picture 802. In this case, the user may perform management operations such as compressing, deleting, and editing on the picture 802 in the storage path. This is not limited in this embodiment of this application.

Figure 19:
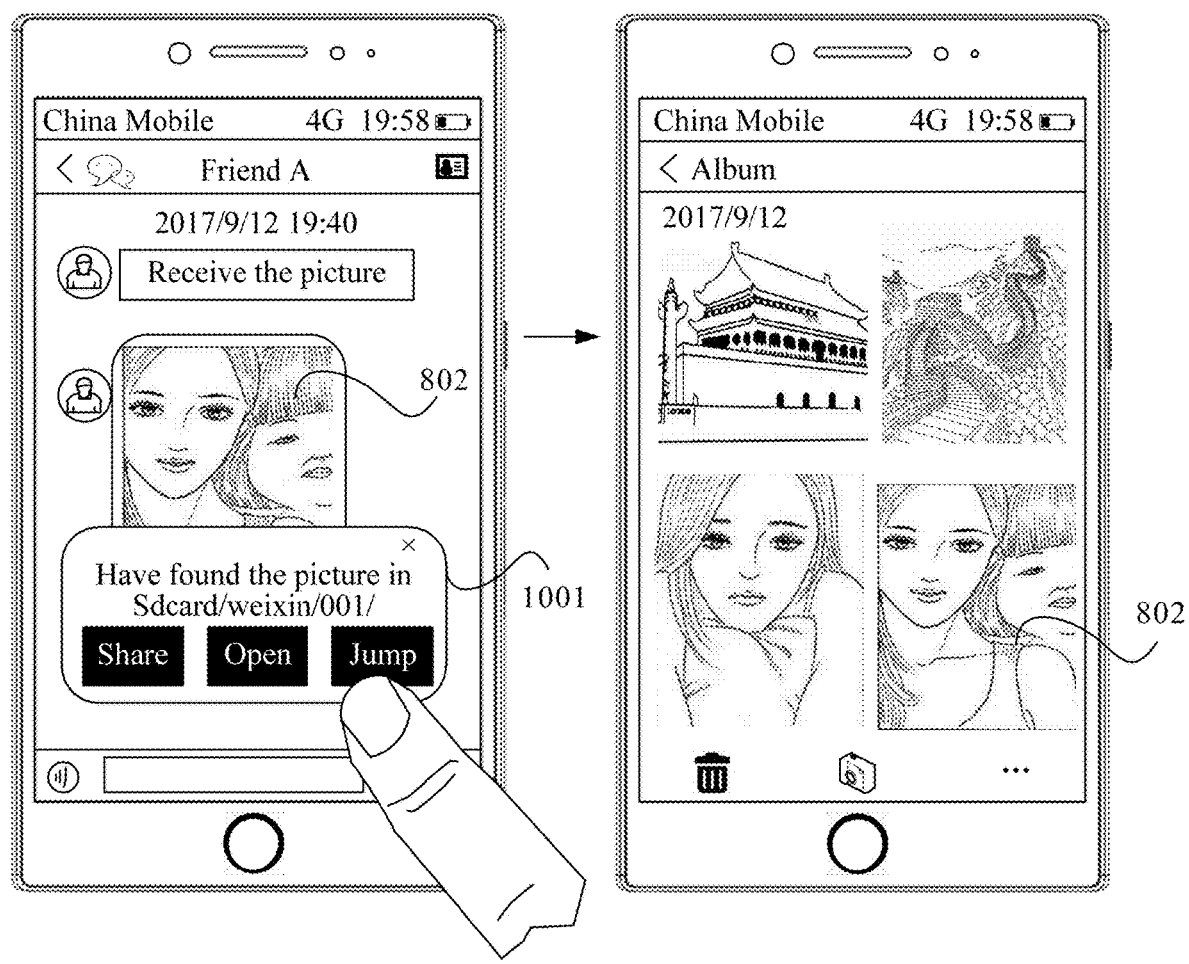
FIG. 19 is a schematic diagram of an application scenario of a file management method according to an embodiment of this application.

Alternatively, as shown in FIG. 19, after receiving, through the WeChat application, the picture 802 sent by the friend A, the terminal may further determine that the specific storage location of the picture 802 is Sdcard/weixin/001/ and further display, on the current chat interface with the friend A, the prompt window 1001 that includes a "jumping" shortcut key. When the terminal detects that the user taps the "jumping" shortcut key, the terminal may jump to a local gallery used to manage the picture 802. The user may further perform management operations such as compressing, deleting, and editing on the picture 802 in the gallery. This is not limited in this embodiment of this application.

It may be understood that for files that are in the terminal and that are not obtained by using a file transfer function or a file download function of the application, for example, a photograph taken or a video recorded by the terminal by using a camera of the terminal, the file management method provided in this embodiment of this application may also be used to manage these files. For example, after obtaining the photograph taken by using the camera, the user may locate a storage location of the photograph based on the file management method provided in the foregoing embodiments in 402 to 406, and provide a control that manages the photograph to the user by displaying a prompt window.

Actions of the terminal in the foregoing steps 401 to 406 may instruct the terminal to implement the foregoing file management method by executing an instruction or software stored in the memory 103 by the processor 101 in FIG. 1.

Figure 20:
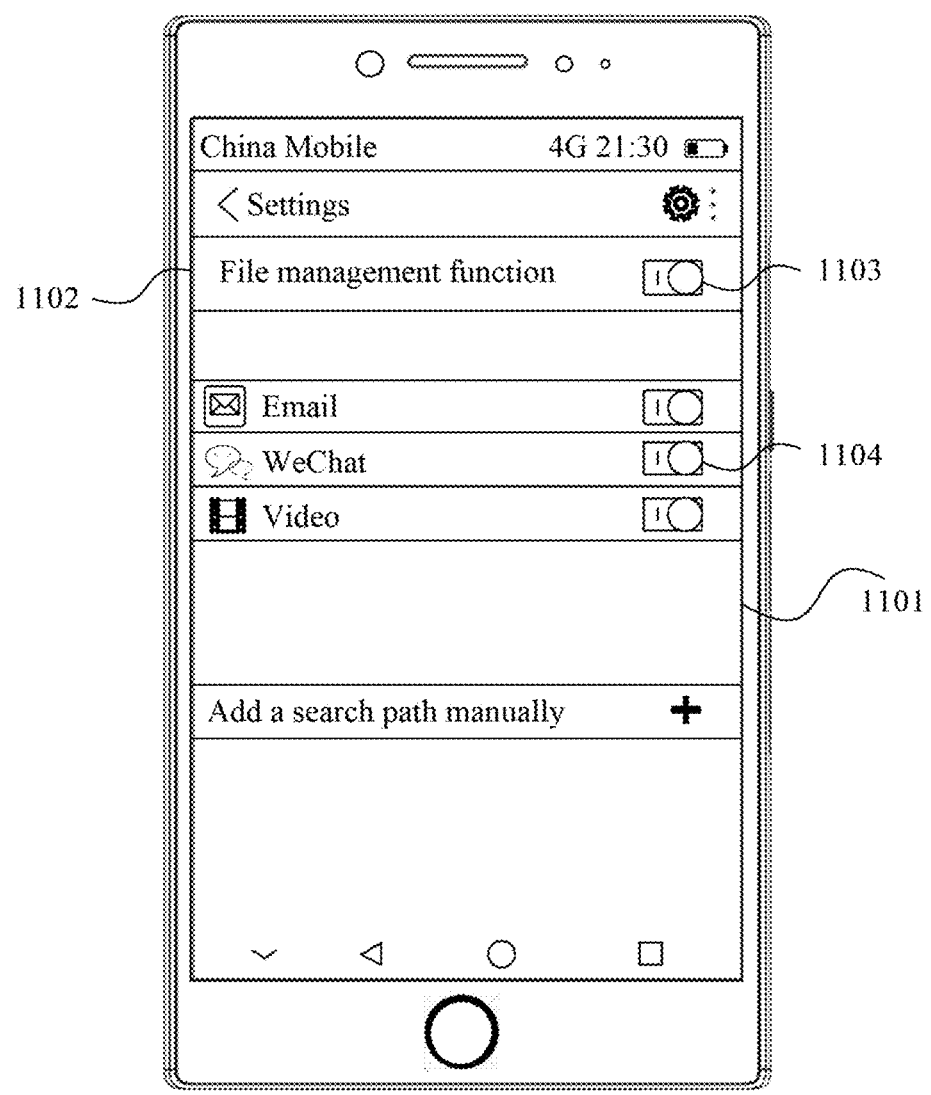
FIG. 20 is a schematic diagram of an application scenario of a file management method according to an embodiment of this application.

In addition, as shown in FIG. 20, the user may further enable or disable a file management function 1102 provided in the foregoing embodiment on a setting interface 1101. When the terminal detects that the user taps and enables a control 1103 of the file management function 1102, the terminal may be triggered to perform the file management method shown in the foregoing steps 401 to 406. Further, when the user taps and enables the control 1103 of the file management function 1102, the user may further enable or disable file management functions of applications in the terminal on the setting interface 1101. After the terminal detects that the user taps and enables a control 1104 of a file management function of the WeChat application, the terminal may monitor, in real time, one or more folders used to store files related to the WeChat application in the memory of the terminal. When a new file is written into these folders, for example, when a new file with a size greater than 2 M is written into a path of Sdcard/weixin/, the terminal may be triggered to record a specific storage path of the new file, to facilitate the terminal to provide a quick entry that may be used to perform cross-application management on the target file to the user, and the user does not need to manually search for the target file in a full disk. Therefore, the file management efficiency in the terminal is improved.

It may be understood that, to implement the foregoing functions, the foregoing terminal or the like includes corresponding hardware structures and/or software modules for performing the functions. A person of ordinary skill in the art should easily be aware that, in combination with the examples described in the embodiments disclosed in this specification, units, algorithms, and steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of this application.

In this embodiment of this application, functional modules of the foregoing terminal or the like may be divided based on the foregoing method examples. For example, functional modules may be divided corresponding to functions, or two or more functions may be integrated into one processing module. The integrated module may be implemented in a form of hardware, or may be implemented in a form of a software functional module. It should be noted that, in this embodiment of this application, module division is an example, and is merely a logical function division. In actual implementation, another division manner may be used.

Figure 21:
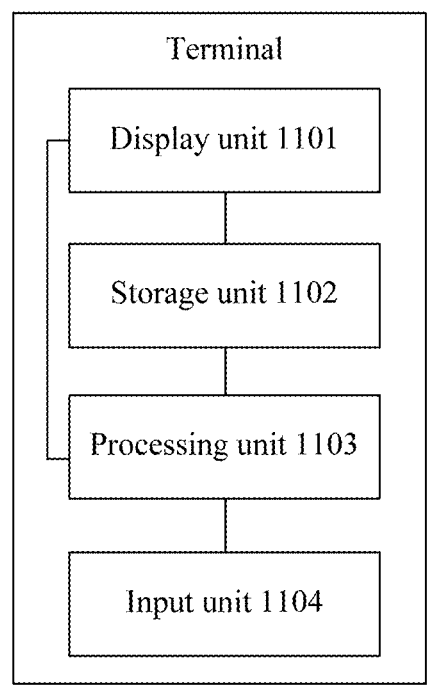
FIG. 21 is a schematic structural diagram of a terminal according to an embodiment of this application.

FIG. 21 is a possible schematic structural diagram of a terminal according to the foregoing embodiments. The terminal 10 includes: a display unit 1101, a storage unit 1102, a processing unit 1103, and an input unit 1104.

The processing unit 1103 is configured to control and manage an action of the terminal. The input unit 1104 is configured to support an input operation performed by a user on the terminal. The storage unit 1102 is configured to store program code and data of the terminal. The display unit 1101 is configured to display information entered by the user or information provided to the user and various menus of the terminal.

Figure 3A:
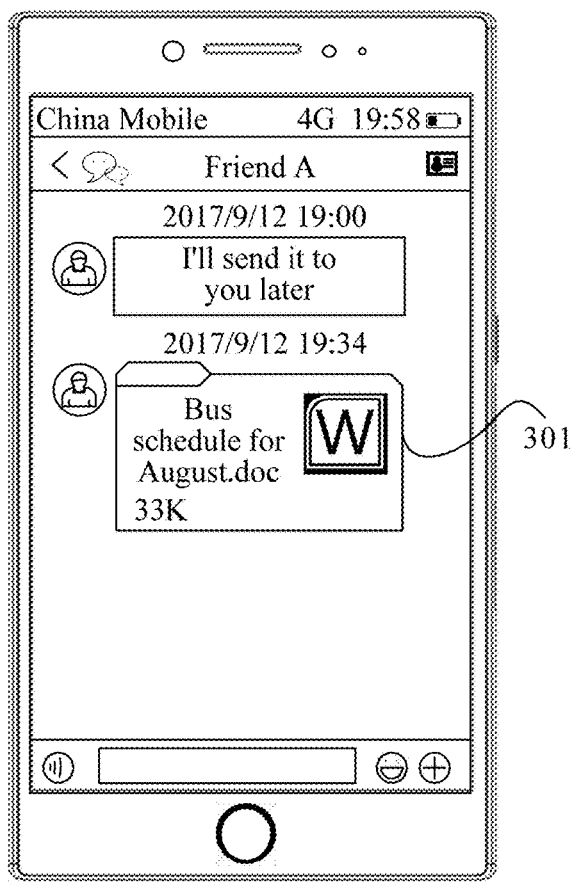
FIG. 3(a) and FIG. 3(b) are a schematic diagram of an application scenario of a file management method according to an embodiment of this application.
Figure 3B:
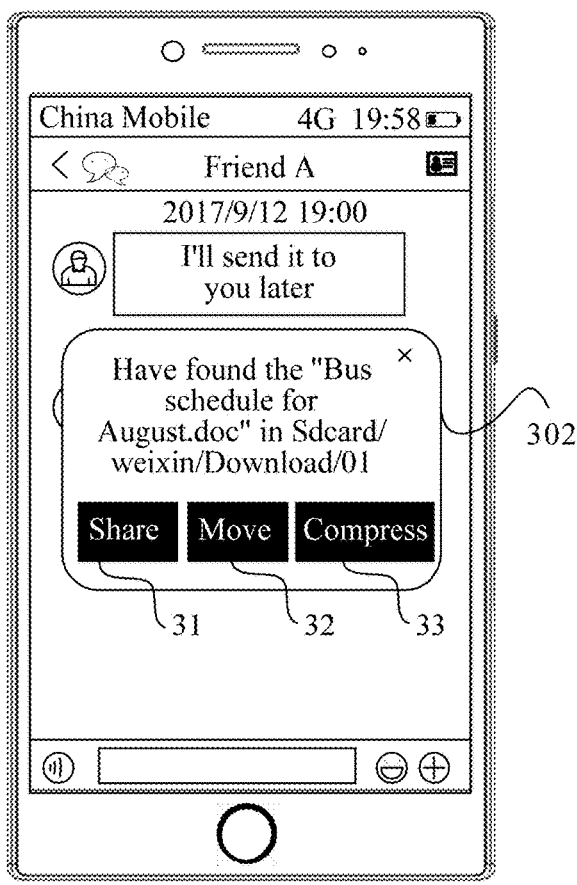

For example, the foregoing display unit 1101 may be configured to support the terminal in performing the process 405 in FIG. 4; the storage unit 1102 may be configured to support the terminal in performing the process 401 in FIG. 3(a) and FIG. 3(b); the processing unit 1103 may be configured to support the terminal in performing the processes 402 to 404 and 406a to 406b in FIG. 4; and the input unit 1104 may be configured to support the terminal in receiving various types of gesture operations entered by the user, such as operations of receiving the sharing function, the opening function, and the jumping function that are triggered by the user in steps 406a to 406b. All related content of the steps in the foregoing method embodiments may be referenced for the function descriptions of the corresponding functional modules. Details are not described herein again.

In addition, when the processing unit 1103 is a processor, the input unit 1104 is a touch pad for receiving a user gesture, the storage unit 1102 is a memory, and the display unit 1101 is a display, the terminal provided in the embodiments of the application may be the mobile phone 100 shown in FIG. 1.

An embodiment of this application further provides a graphical user interface (GUI), where the graphical user interface is stored in a terminal, the terminal includes a touchscreen, a memory, and one or more processors, and the one or more processors are configured to execute one or more computer programs stored in the memory. The graphical user interface specifically includes a user interface displayed when the terminal performs any one of the foregoing steps 401 to 406.

An embodiment of this application further provides a computer-readable storage medium, and the computer-readable storage medium stores an instruction, where when the instruction is run on the terminal, the terminal is enabled to perform any one of the foregoing file management methods in steps 401 to 406.

An embodiment of this application further provides a computer program product including an instruction, where when the computer program product is run on the foregoing terminal, the terminal is enabled to perform any one of the foregoing file management methods in steps 401 to 406.

All or some of the foregoing embodiments may be implemented through software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disk (DVD)), a semiconductor medium (for example, a solid-state drive Solid State Disk (SSD)), or the like. All or some of the foregoing embodiments may be implemented through software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a SSD)), or the like.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A file management method performed by a terminal having a first application installed thereon, the method comprising:
   displaying, by the terminal, an interface of the first application;
   storing, by the terminal, a target file received through the first application;
   extracting, by the terminal, related information of the target file, wherein the related information of the target file comprises file feature information, and the file feature information comprises a name of the target file;
   searching, by the terminal, for a storage path of the target file in storage space of the terminal based on the related information of the target file, wherein the related information of the target file further comprises application feature information of the first application, and the application feature information comprises a name of the first application, a name of a display interface of the terminal when the target file is being downloaded, or a combination thereof, and the searching, by the terminal, for the storage path of the target file in storage space of the terminal based on the related information of the target file comprises:
     determining, by the terminal, a search path of the target file based on the application feature information of the first application, and
     searching, by the terminal, the search path for the target file based on the file feature information of the target file; and
   displaying, by the terminal, a control used for performing file management on the target file on the interface of the first application, when the storage path of the target file is successfully found.

2. The method according to claim 1, wherein the determining, by the terminal, the search path of the target file based on the application feature information of the first application comprises:

searching, by the terminal, a stored correspondence between application feature information and search paths for a search path corresponding to the application feature information of the first application.

3. The method according to claim 2, wherein when the search path corresponding to the application feature information of the first application is not comprised in the correspondence between application feature information and search paths, the method further comprises:

searching, by the terminal based on a preset priority order, for the storage path of the target file in the storage space of the terminal in sequence.

4. The method according to claim 2, wherein after the terminal searches for the storage path of the target file in the terminal based on the file feature information, the method further comprises:

when the storage path of the target file is successfully found, updating, by the terminal in the correspondence between application feature information and search paths, the found storage path of the target file as the search path corresponding to the application feature information of the first application.

5. The method according to claim 1, wherein before the extracting, by the terminal, related information of the target file, the method further comprises:

receiving, by the terminal, a target gesture performed by a user for the target file; and the extracting, by the terminal, related information of the target file further comprises:

extracting, by the terminal, the related information of the target file in response to the target gesture.

6. The method according to claim 1, wherein the target file is a picture, and the file feature information further comprises a picture eigenvalue for reflecting display content in the picture; or the target file is audio, and the file feature information further comprises label information carried in the audio.

7. The method according to claim 1, wherein the displaying, by the terminal, the control used for performing file management on the target file comprises:

displaying, by the terminal, a floating target prompt window in a current display interface of the first application, wherein the target prompt window comprises a shortcut key used for managing the target file.

8. The method according to claim 7, wherein the shortcut key comprises a sharing shortcut key; and after the displaying, by the terminal, the control used for performing file management on the target file, the method further comprises:

when it is detected that the user triggers the sharing shortcut key, displaying, by the terminal, a shortcut key of a second application for allowing sharing the target file, wherein the second application is different from the first application; and when it is detected that the user triggers the shortcut key of the second application, sharing, by the terminal, the target file to a device of another user through the second application, or loading, by the terminal, the target file as an attachment to a display interface of the second application.

9. The method according to claim 7, wherein the shortcut key comprises an opening shortcut key; and after the displaying, by the terminal, the control used for performing file management on the target file, the method further comprises:

when it is detected that the user triggers the opening shortcut key, displaying, by the terminal, a shortcut key of a third application for allowing opening the target file, wherein the third application is different from the first application; and when it is detected that the user triggers the shortcut key of the third application, opening, by the terminal, the target file by using the third application.

10. The method according to claim 7, wherein the shortcut key comprises a jumping shortcut key; and after the displaying, by the terminal, the control used for performing file management on the target file, the method further comprises:

when it is detected that the user triggers the jumping shortcut key, displaying, by the terminal, an interface of a local path that stores or manages the target file.

11. The method according to claim 1, wherein when the storage path of the target file is successfully found, the method further comprises:

displaying, by the terminal, the storage path of the target file in a current display interface of the first application.

12. A terminal, having a first application installed thereon, wherein the terminal comprises a processor, a memory, a display, and an input device coupled with to the processor, wherein the memory stores an instruction, which when the instruction is executed by the processor of the terminal, causes the processor to performs operations for a file management method, comprising:

displaying, on the display, an interface of the first application;

storing, in the memory, a target file received through the first application;

extracting related information of the target file, wherein the related information of the target file comprises file feature information, and the file feature information comprises a name of the target file;

searching for a storage path of the target file in storage space of the terminal based on the related information of the target file, wherein the related information of the target file further comprises application feature information of the first application, and the application feature information comprises a name of the first application, a name of a display interface of the terminal when the target file is being downloaded, or a combination thereof, and the searching, by the terminal, for the storage path of the target file in storage space of the terminal based on the related information of the target file comprises:

determining, by the terminal, a search path of the target file based on the application feature information of the first application, and searching, by the terminal, the search path for the target file based on the file feature information of the target file; and displaying, on the display, a control used for performing file management on the target file on the interface of the first application, when the storage path of the target file is successfully found.

13. The terminal according to claim 12, wherein the instruction when executed by the processor, causes the processor to performs further operations comprising:

searching a stored correspondence between application feature information and search paths for a search path corresponding to the application feature information of the first application.

14. The terminal according to claim 13, wherein the instruction when executed by the processor, causes the processor to performs further operations comprising:

searching for the storage path of the target file in the storage space of the terminal in sequence based on a preset priority order when the search path corresponding to the application feature information of the first application is not comprised in the correspondence between application feature information and search paths.

15. The terminal according to claim 13, the instruction when executed by the processor, causes the processor to performs further operations comprising:

when the processor successfully finds the storage path of the target file, update, in the correspondence between application feature information and search paths, the found storage path of the target file as the search path corresponding to the application feature information of the first application.

16. The terminal according to claim 12, wherein the instruction when executed by the processor, causes the processor to performs further operations comprising:

receiving, by the input device, a target gesture performed by a user for the target file; and extracting the related information of the target file in response to the target gesture.

17. The terminal according to claim 12, wherein the instruction when executed by the processor, causes the processor to performs further operations comprising:

displaying, by the display, a floating target prompt window in a current display interface of the first application, wherein the target prompt window comprises a shortcut key used for managing the target file.

18. A non-transitory computer-readable storage medium, storing an instruction, wherein when the instruction is run on a terminal, the terminal performs operations for a file management method, comprising:

displaying, by the terminal, an interface of the first application;

storing, by the terminal, a target file received through the first application;

extracting, by the terminal, related information of the target file, wherein the related information of the target file comprises file feature information, and the file feature information comprises a name of the target file;

searching, by the terminal, for a storage path of the target file in storage space of the terminal based on the related information of the target file, wherein the related information of the target file further comprises application feature information of the first application, and the application feature information comprises a name of the first application, a name of a display interface of the terminal when the target file is being downloaded, or a combination thereof, and the searching, by the terminal, for the storage path of the target file in storage space of the terminal based on the related information of the target file comprises:

determining, by the terminal, a search path of the target file based on the application feature information of the first application, and searching, by the terminal, the search path for the target file based on the file feature information of the target file; and displaying, by the terminal, a control used for performing file management on the target file on the interface of the first application, when the storage path of the target file is successfully found.

* * * * *